(12) United States Patent
Barbieri et al.

(10) Patent No.: US 11,855,830 B2
(45) Date of Patent: Dec. 26, 2023

(54) IMAGE REJECTION COMPENSATION METHOD FOR I/Q DOWN-CONVERSION IN RADIO FREQUENCY RECEIVERS, CORRESPONDING CIRCUIT, RADIO FREQUENCY RECEIVER DEVICE AND COMPUTER PROGRAM PRODUCT

(71) Applicant: STMICROELECTRONICS S.r.l., Agrate Brianza (IT)

(72) Inventors: Alessandro Barbieri, Pozzuolo Martesana (IT); Fabio Dell'Orto, Lissone (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 464 days.

(21) Appl. No.: 17/123,003

(22) Filed: Dec. 15, 2020

(65) Prior Publication Data

US 2021/0194746 A1 Jun. 24, 2021

(30) Foreign Application Priority Data

Dec. 17, 2019 (IT) .......................... 102019000024298

(51) Int. Cl.
*H04L 27/38* (2006.01)
*H04L 27/36* (2006.01)
(Continued)

(52) U.S. Cl.
CPC ........ *H04L 27/364* (2013.01); *H04L 27/2089* (2013.01); *H04L 27/26412* (2021.01); *H04L 27/368* (2013.01); *H04L 27/3863* (2013.01)

(58) Field of Classification Search
CPC ............... H04L 27/364; H04L 27/2089; H04L 27/26412; H04L 27/368; H04L 27/3863;
(Continued)

(56) References Cited

U.S. PATENT DOCUMENTS 8,363,712 B2 * 1/2013 Hormis ............... H04L 27/3863
375/232
8,509,298 B2 * 8/2013 Hormis .................. H03D 3/009
375/232
(Continued)

FOREIGN PATENT DOCUMENTS

WO 2012/094087 A1 7/2012

OTHER PUBLICATIONS

Van Gerven, et al., "Signal Separation by Symmetric Adaptive Decorrelation: Stability, Convergence, and Uniqueness," *IEEE Transactions on Signal Processing* 43(7):1602-1612, 1995.

*Primary Examiner* — Siu M Lee
(74) *Attorney, Agent, or Firm* — SEED INTELLECTUAL PROPERTY LAW GROUP LLP

(57) ABSTRACT

An input signal has a desired signal component and an interfering signal component superimposed thereon. Interfering component estimation processing is applied to the input signal, obtaining as a result a filtered signal comprising a sequence of filtered data samples. The filtered signal is subtracted from the input signal obtaining as a result an output signal comprising a sequence of output data samples. The interfering component estimation processing applies conjugating processing to the input signal, providing a conjugated version of the input signal. An adaptive signal processing coefficient is computed and adaptive signal processing is applied to the conjugated version of the input signal using the adaptive processing coefficient.

30 Claims, 11 Drawing Sheets

(51) Int. Cl.
*H04L 27/26* (2006.01)
*H04L 27/20* (2006.01)

(58) Field of Classification Search
CPC .... H04L 27/0014; H03H 17/00; H03H 17/02; H03H 21/0012; H03H 21/0027; H03H 2017/0081; H03H 2021/0094; H03F 1/26; H04B 1/26
See application file for complete search history.

(56) References Cited

U.S. PATENT DOCUMENTS 9,148,328 B2* 9/2015 Zhang ................ H04B 1/123
2017/0126465 A1* 5/2017 Kim .................. H04L 27/364

* cited by examiner

IMAGE REJECTION COMPENSATION METHOD FOR I/Q DOWN-CONVERSION IN RADIO FREQUENCY RECEIVERS, CORRESPONDING CIRCUIT, RADIO FREQUENCY RECEIVER DEVICE AND COMPUTER PROGRAM PRODUCT

BACKGROUND

Technical Field

The description relates to a method of signal processing for wideband radio communication receivers and receiver architectures. Specifically, the description relates to compensating interference generated by receiver I/Q imbalance, in particular for the reception of wideband signals.

One or more embodiments may be applied, for instance, to terrestrial broadcast radio receivers, satellite broadcast radio receivers, GNSS receivers, etc.

Description of the Related Art

The reception of radio frequency channels by usage of heterodyne architectures is affected by the interference of the so-called image signal.

For instance, radio receiver architectures, especially those based on a heterodyne technique and employing an I/Q mixer in a Radio Frequency Front-End (briefly, RFFE) to tune to a Radio Frequency (briefly, RF) channel, may be affected by a parasitic effect: due to crosstalk generated by I/Q imbalance, an attenuated replica of the so-called image band may overlap onto the desired signal band, resulting in in-band levels of the image replica that may degrade performance beyond an acceptable level.

RFFEs are known devices that may have internal circuitry elements configured to generate and/or process so-called in-phase I and quadrature Q signals in response to the receipt of an RF (radio frequency) signal $x_{RF}(t)$. RFFEs configured for down-converting signal components whose spectrum is transmitted by modulating a carrier placed at the RF frequency $\omega_{RF}$, possibly related to the nominal frequency of the desired channel within the RF signal $x_{RF}(t)$, to a convenient Intermediate Frequency (IF) $\omega_{IF}$, which can either be positive, negative or, in direct down-conversion applications, can also be 0 Hz.

For instance, a conventional RFFE receiver arrangement 10, as exemplified in FIG. 1, may comprise:
- an input node $x_{RF}$ configured to receive an RF signal $x_{RF}(t)$, e.g., carrying multiple channels of (user-)data,
- an impedance matching element 11, coupled to a low-noise amplifier (briefly, LNA) 12, and
- an analog I/Q down-converter 13, comprising:
  a) a first down-converter branch 13I, comprising a first RF-IF mixer 14I and a first IF low-pass filter 16I, the first RF-IF mixer 14I coupled to the first IF low-pass filter 16I,
  b) a second down-converter branch 13Q, comprising a second RF-IF mixer 14Q and a second IF low-pass filter 16Q, the second RF-IF mixer 14Q coupled to the second IF low-pass filter 16Q.

The first 13I and second 13Q down-converter branches, which may comprise respective mixing and filtering stages, may be configured to apply mixing processing 14I, resp. 14Q, to the RF signal $x_{RF}(t)$ and a local oscillator (LO) signal $x_{LO}(t)$ component I, resp. Q, the mixing processing 14I, 14Q followed by low-pass filtering processing 16I, resp. 16Q.

As mentioned, such local oscillator (LO) signal $x_{LO}(t)$ may be modeled as split into respective I/Q components having a frequency $\omega_{LO}=\omega_{RF}-\omega_{IF}$, which may be expressed in time-domain as, respectively:

$$x_{LO,I}(t)=\text{Re}[x_{LO}(t)]$$

$$x_{LO,Q}(t)=\text{Im}[x_{LO}(t)]$$

As a result of mixing processing and low-pass filtering, a down-converted signal $x_{IF}(t)$ may be generated, the down-converted signal $x_{IF}(t)$ having respective I and Q components which may be expressed as:

$$x_{IF,I}(t)=\text{Re}[x_{IF}(t)]$$

$$x_{IF,Q}(t)=\text{Im}[x_{IF}(t)]$$

It is noted that the oscillator frequency $\omega_{LO}$ can either be lower (low-side injection), higher (high-side injection) or equal (direct down-conversion) with respect to the RF frequency $\omega_{RF}$, according to the value used for the intermediate frequency $\omega_{IF}$.

An RFFE receiver 10 is hence tuned to collect the RF signal $x_{RF}(t)$. However, the analog down-converter branches 13I, 13Q may have differential DC offset, gain, and quadrature phase errors. For instance, when mismatches exist between:
- the gains of the two local oscillator signals for the RF-IF mixers 14I and 14Q of the branches 13I, 13Q of the (analog) down-converter 13, and/or
- their phases with respect to the quadrature condition, and/or
- any of the IF elements 16I (amplifier, low-pass filter, analog portion of analog-to-digital converter) of the first down-converter branch 13I with respect to the respective elements 16Q of the second down-converter branch 13Q, IF and baseband signals may be corrupted.

Existing solutions to such an imbalance problem may comprise applying specific training sequences at wideband receiver inputs and running calibration algorithms to the receiver before its startup/operation. Such solutions may be anyway difficult to implement, e.g., due to high implementation costs, and may facilitate solely sub-optimum results. For instance, calibration parameters evaluation may employ a Digital Signal Processor (DSP) and, also, it may be rather difficult to find and generate the proper training sequence.

As mentioned, solutions employing training signals may partially calibrate the device since, usually, it is difficult to obtain optimal parameters setting.

Another disadvantage of solutions employing a training sequence is the employ of such sequences at the Electrical Wafer Sorting (EWS) phase, in order to properly calibrate the receiver or during final test of the device, at the application level before operation. Calibration operations may be time consuming, increasing the cost of EWS or final test stages. Customers may rather avoid applying calibration phase at application level.

BRIEF SUMMARY

In an embodiment, a method comprises: receiving an input signal comprising at least one sequence of input data samples separated by a sampling period therebetween, the input signal comprising a desired signal component and an interfering signal component superimposed thereon; applying interfering component estimation processing to said input signal obtaining as a result a filtered signal comprising a sequence of filtered data samples; and subtracting said filtered signal from said input signal and obtaining as a result an output signal comprising a sequence of output data samples. The interfering component estimation processing comprises: applying conjugating processing to said input signal, providing a conjugated version of said input signal; computing of at least one adaptive signal processing coefficient value; and applying adaptive signal processing to said conjugated version of said input signal using at least one adaptive processing coefficient. The computing at least one adaptive signal processing coefficient value comprises: performing correlation processing between said sequence of output data samples of the output signal and a conjugated version of said sequence of output data samples of the output signal and obtaining as a result a sequence of estimates of residual correlation; and applying integration processing to said sequence of estimates of residual correlation provided, said integration processing using an integration step parameter and at least one starting point parameter, obtaining at least one computed adaptive signal processing coefficient as a result of applying said integration processing. In an embodiment, applying adaptive signal processing comprises applying processing selected out of: adaptive multiplication processing having at least one multiplication factor equal to said at least one computed adaptive signal processing coefficient; and adaptive finite impulse response, FIR, filtering processing, said adaptive FIR filtering processing comprising computing a weighted sum of a conjugated version of data samples in said sequence of input data samples comprised in said input signal, using said at least one adaptive processing coefficient as weights of said weighted sum. In an embodiment, the adaptive FIR filtering processing comprises applying said at least one adaptive processing coefficient to a subset of elements belonging to an input delay line of the FIR at a related subset of delay values; and performing correlation processing and applying integration processing respectively comprise calculating and integrating estimates of residual correlation at delay values of said related subset of delay values. In an embodiment, the adaptive FIR filtering coefficients are applied to a comb of elements belonging to said input delay line of the FIR, the comb comprising a number $N_d$ of delay elements, the delay elements having a distance value multiple of said sampling period by a factor d. In an embodiment, the distance value is in excess of ten times said sampling period. In an embodiment, selecting between said adaptive multiplication processing and said adaptive FIR filtering processing in applying said adaptive signal processing comprises: providing a first adaptive signal processing configuration register configured to store a first value or a second value; and selecting between applying one of said adaptive multiplication processing or said adaptive FIR filtering processing as a function of said first value or said second value stored in said first adaptive signal processing configuration register. In an embodiment, the method comprises: providing at least one configuration register configured for storing indexes of delay elements in the set of delay elements of the delay line; and selecting a subset of delay elements in the set of delay elements of the delay line as a function of said indexes stored in the at least one configuration register. In an embodiment, applying integration processing comprises applying loop filter processing to said sequence of estimates of residual correlation provided. In an embodiment, applying integration processing comprises: providing a first integration parameter register configured to store a value of said integration step parameter; providing a second integration parameter register configured to store a value of said at least one starting point parameter and a third integration parameter register configured to store a value indicating whether to activate said integration processing to use said value of said at least one starting point parameter; or combinations thereof. In an embodiment, computing at least one value of said at least one adaptive processing coefficient comprises applying automatic gain control, AGC, processing to said output signal. In an embodiment, performing correlation processing between said sequence of output data samples of the output signal and a conjugated version of said sequence of output data samples of the output signal comprises performing block-like correlation of a number of adjacent data samples forming a block having block-length L of data samples, wherein said block-length L is selected as a function of a length value stored in a configuration register. In an embodiment, the adaptive FIR filtering processing comprises second order (or three tap) adaptive FIR filtering processing.

In an embodiment, a circuit, comprises: an input node configured to receive an input signal comprising at least one sequence of input data samples, the input signal comprising a desired signal component and an interfering signal component superimposed thereon, wherein input data samples in the sequence of input data samples are separated by a sampling period therebetween; and signal processing circuitry coupled to the input node, wherein the signal processing circuitry, in operation: applies interfering component estimation processing to said input signal obtaining as a result a filtered signal comprising a sequence of filtered data samples; and subtracts said filtered signal from said input signal, obtaining an output signal comprising a sequence of output data samples, wherein said interfering component estimation processing comprises: applying conjugating processing to said input signal, providing a conjugated version of said input signal; computing an adaptive signal processing coefficient value; and applying adaptive signal processing to said conjugated version of said input signal using the adaptive processing coefficient, wherein said computing the adaptive signal processing coefficient value comprises: performing correlation processing between said sequence of output data samples of the output signal and a conjugated version of said sequence of output data samples of the output signal and obtaining as a result a sequence of estimates of residual correlation; applying integration processing to said sequence of estimates of residual correlation, said integration processing using an integration step parameter and at least one starting point parameter, obtaining the adaptive signal processing coefficient as a result of applying said integration processing. In an embodiment, the signal processing circuitry, in operation, selectively applies one of: adaptive multiplication processing having a multiplication factor equal to said computed adaptive signal processing coefficient; and adaptive finite impulse response, FIR, filtering processing, said adaptive FIR filtering processing comprising computing a weighted sum of a conjugated version of data samples in said sequence of input data samples comprised in said input signal, using said adaptive processing coefficient as a weight of said weighted sum. In an embodiment, the adaptive FIR filtering processing comprises applying the adaptive processing coefficient to a subset of elements belonging to an input delay line of the FIR at a related subset of delay values; and performing correlation processing and applying integration processing respectively comprise calculating and integrating estimates of residual correlation at delay values of said related subset of delay values. In an embodiment, adaptive FIR filtering coefficients are applied to a comb of elements belonging to said input delay line of the FIR, the comb comprising a number $N_d$ of delay elements, the delay elements having a distance value multiple of said sampling period by a factor d. In an embodiment, said distance value is in excess ten times the sampling period. In an embodiment, the signal processing circuitry, in operation, selects between said adaptive multiplication processing and said adaptive FIR filtering processing by: providing a first adaptive signal processing configuration register configured to storing a first value or a second value in a first adaptive signal processing configuration register; and applying one of said adaptive multiplication processing or said adaptive FIR filtering processing as a function of said first value or said second value stored in said first adaptive signal processing configuration register. In an embodiment, the signal processing circuitry, in operation, stores indexes of delay elements in the set of delay elements of the delay line in a configuration register; and selects a subset of delay elements in the set of delay elements of the delay line as a function of said indexes. In an embodiment, the integration processing comprises applying loop filter processing to said sequence of estimates of residual correlation provided. In an embodiment, the integration processing comprises: storing a value of said integration step parameter; storing a value of said at least one starting point parameter and a control parameter to activate said integration processing to use said value of said at least one starting point parameter; or combinations thereof. In an embodiment, the signal processing circuitry, in operation, applies automatic gain control, AGC, processing to the output signal. In an embodiment, performing correlation processing between said sequence of output data samples of the output signal and a conjugated version of said sequence of output data samples of the output signal comprises performing block-like correlation of a number of adjacent data samples forming a block having block-length L of data samples, wherein said block-length L is selected as a function of a length value stored in a configuration register. In an embodiment, the adaptive FIR filtering processing comprises second order (or three-tap) adaptive FIR filtering processing. In an embodiment, said signal processing circuitry comprises a complex down-converter circuit including: a first mixer branch, having a common input node configured to receive at least one signal, a first digital mixer, a first digital low pass filter, a first baseband decimator with decimation factor M and a first interfacing node, the first interfacing node configured to provide a first signal component; a second mixer branch, having a common input node configured to receive at least one signal, a second digital mixer, a second digital low pass filter, a second baseband decimator with decimation factor M and a second interfacing node, the second interfacing node configured to provide a second signal component; and an image rejection correction (IRC) control loop configured to apply interfering component removal processing to said first signal component, and to said second signal component.

In an embodiment, a radio frequency receiver comprises: an antenna configured to receive an RF signal; a radio frequency front-end coupled to said antenna, the radio frequency front-end configured to receive said RF signal at an input node and to apply down-conversion processing to said radio frequency signal, the radio frequency front-end having a first output node and configured for providing an intermediate frequency, IF, signal as a result of said down-conversion processing at said first output node; an analog-to-digital converter, ADC, having an input node coupled to said first output node and a second output node, the ADC configured to receive said IF signal from the first output node, to apply signal sampling thereto and to provide a sampled sequence of data samples of said IF signal at said second output node; and signal processing circuitry coupled to the second output node, wherein the signal processing circuitry, in operation: applies interfering component estimation processing to said input signal, obtaining a filtered signal comprising a sequence of filtered data samples; and subtracts said filtered signal from said input signal, obtaining an output signal comprising a sequence of output data samples, wherein said interfering component estimation processing comprises: applying conjugating processing to said input signal, generating a conjugated version of said input signal; computing an adaptive signal processing coefficient value; and applying adaptive signal processing to said conjugated version of said input signal using the adaptive processing coefficient, wherein said computing the adaptive signal processing coefficient value comprises: performing correlation processing between said sequence of output data samples of the output signal and a conjugated version of said sequence of output data samples of the output signal, obtaining a sequence of estimates of residual correlation; and applying integration processing to said sequence of estimates of residual correlation, said integration processing using an integration step parameter and at least one starting point parameter, obtaining the adaptive signal processing coefficient. In an embodiment, the signal processing circuitry comprises a complex down-converter circuit including: a first mixer branch, having a common input node configured to receive at least one signal, a first digital mixer, a first digital low pass filter, a first baseband decimator with decimation factor M and a first interfacing node, the first interfacing node configured to provide a first signal component; a second mixer branch, having a common input node configured to receive at least one signal, a second digital mixer, a second digital low pass filter, a second baseband decimator with decimation factor M and a second interfacing node, the second interfacing node configured to provide a second signal component; and an image rejection correction (IRC) control loop configured to apply interfering component removal processing to said first signal component, and to said second signal component. In an embodiment, the interfering component estimation processing comprises: computing a plurality of adaptive signal processing coefficient values; and applying adaptive signal processing to said conjugated version of said input signal using the plurality of adaptive processing coefficients values.

In an embodiment, a non-transitory computer readable medium's contents configure a receiver to perform a method, the method comprising: applying interfering component estimation processing to an input signal, obtaining a filtered signal comprising a sequence of filtered data samples; and subtracting the filtered signal from the input signal, obtaining an output signal comprising a sequence of output data samples, wherein the interfering component estimation processing comprises: applying conjugating processing to said input signal, generating a conjugated version of the input signal; computing one or more adaptive signal processing coefficients; and applying adaptive signal processing to the conjugated version of the input signal using the one or more adaptive processing coefficients, wherein the computing the adaptive signal processing coefficients comprises: performing correlation processing between the sequence of output data samples of the output signal and a conjugated version of the sequence of output data samples of the output signal, obtaining a sequence of estimates of residual correlation; applying integration processing to the sequence of estimates of residual correlation, said integration processing using an integration step parameter and at least one starting point parameter, obtaining the adaptive signal processing coefficients. In an embodiment, the contents comprise instructions, which, when executed by a processor of the receiver, cause the receiver to perform the method.

One or more embodiments may comprise a tailored modified Symmetric Adaptive Decorrelation algorithm, facilitating to solve the problems of SAD algorithm for wideband receivers, where the I/Q imbalance can have strong variations versus frequency.

One or more embodiments may comprise an image rejection correction loop.

One or more embodiments may comprise an adaptive filter stage and detector/correlator stage.

One or more embodiments may comprise at least one adjustable tap-delay line.

Specifically, both adaptive filter stage and detector/correlator stage may employ such an adjustable tap-delay, facilitating to mitigate side effects due to the decorrelation time of clean source signals.

In one or more embodiments, such an approach can be used likewise in loop-implementations (e.g., in steady-state conditions) as well as in closed form implementations (e.g., to speed-up the initial convergence).

One or more embodiments may, advantageously:
facilitating avoiding a chip/receiver calibration phase,
facilitating self-converging to optimal parameter values;
facilitating receiver operations in both narrowband or wideband receiver architectures
reducing application management resources,
facilitating adjustability and adaptiveness, e.g., using a Finite-duration Impulse Response (FIR) filter and a correlator comprising tap-delays, increasing flexibility;
improving receiver performances and sensitivity with strong image interferer.

BRIEF DESCRIPTION OF THE SEVERAL VIEWS OF THE DRAWINGS

One or more embodiments will now be described, by way of non-limiting example only, with reference to the annexed Figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

The drawings are in simplified form and are not to precise scale. For the sake of simplicity, directional (up/down, etc.) or motional (forward/back, etc.) terms may be used with respect to the drawings. The term "couple" and similar terms do not necessarily denote direct and immediate connections, but also include connections through intermediate elements or devices.

Also, throughout this description, certain circuit nodes and the signals at these nodes will be indicated with same reference for simplicity and ease of explanation.

Figure 1:
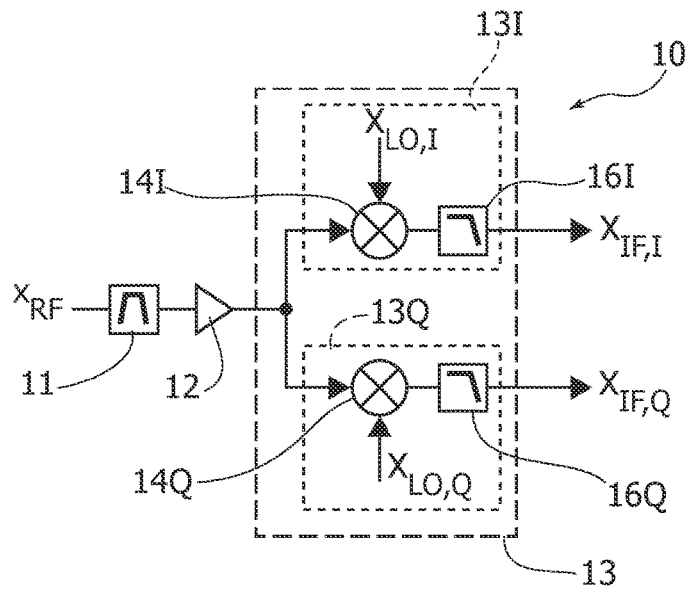
FIG. 1 is discussed in the foregoing.
Figure 2:
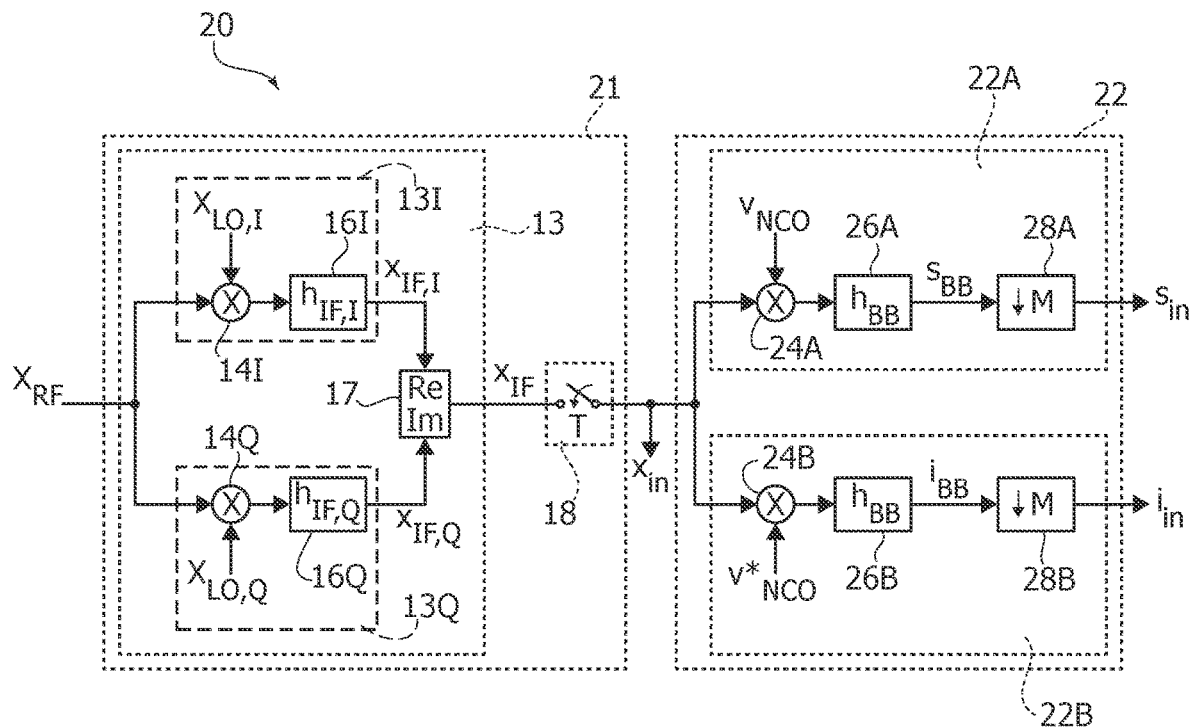
FIG. 2 is an exemplary diagram of an RF front-end architecture and following processing, for instance up to baseband signals.

FIG. 2 may be used to provide an equivalent model of an RFFE 20 and following processing, for instance up to baseband signals, comprising for instance:
an input node $x_{RF}$ configured to receive an RF signal,
a first down-conversion stage 21 from RF to IF (briefly, RF-IF stage), for instance an (analog) RF-IF down-converter, and
a second down-conversion stage 22 from IF to baseband (briefly, IF-BB stage), for instance a digital IF-BB down-converter.

In a single down-conversion chain 21, for instance, the first down-conversion stage 21 may provide input to the subsequent IRC processing stages via interfacing node $x_{in}$.

In a double down-conversion chain 20, for instance, both the first down-conversion stage 21 and the second down-conversion stage 22 are coupled together and may provide inputs to subsequent IRC processing stages via interfacing nodes $s_{in}$, $i_{in}$.

For instance, the first down-conversion stage 21 may comprise an analog I/Q down-converter 13 comprising RF-IF mixers 14I, 14Q coupled to the input node $x_{RF}$, IF low-pass filters 16I, 16Q coupled to corresponding mixers, an intermediate frequency analog-to-digital converter (briefly, ADC) 18, for instance having sampling period T, an interfacing node $x_{in}$.

For instance, as exemplified in FIG. 2, the first down-conversion stage 21 may virtually comprise a combiner 17, for instance a two-real to complex converter, modeling the combination of I/Q signal components interposed between low-pass filters 16I, 16Q in respective branches of the down-converter 13, wherein the combiner 17 may be configured to provide an intermediate frequency signal $x_{IF}$ to the ADC 18. The ADC in turn may sample the signal and provide it at the interfacing node $x_{in}$ and/or to the second down-conversion stage 22.

For instance, the second down-conversion stage 22 may be configured for receiving a time-sampled IF signal and to apply processing thereto.

For instance, the second down-conversion stage 22 may comprise:
- a first branch 22A, comprising a first digital IF-BB mixer 24A, a first digital baseband low-pass filter (briefly, BB-LPF) 26A, a first baseband decimator 28A with decimation factor M, a first interfacing node $s_{in}$,
- a second branch 22B, comprising a second digital IF-BB mixer 24B, a second digital baseband low-pass filter (briefly, BB-LPF) 26B, a second baseband decimator 28B with decimation factor M, a second interfacing node $i_{in}$.

In the example considered, the IF-BB mixers 24A, 24B may comprise a pair of complex mixers, typically implemented as numerically controlled oscillators (briefly, NCOs), configured to provide signals for converting to zero-frequency, respectively, the desired signal and the image signal.

In the following, a continuous-time signal may be indicated as $x(t)$, the related spectrum is indicated as $X(\omega)$, assuming the following definition of the Fourier transform:

$$X(\omega) = \int_{-\infty}^{\infty} x(t)e^{-j\omega t} dt.$$

In the following, a discrete-time signal, which may be possibly obtained by sampling with period T a continuous-time signal $x_a(t)$, may be indicated as $x(k)=x_a(kT)$, where k is the discrete-time index. The related spectrum may be indicated as $X(\omega)$, in the hypothesis of defining the discrete-time Fourier transform as follows, applying a suitable scaling:

$$X(\omega) = T \sum_{k=-\infty}^{\infty} x(n)e^{-j\omega kT}.$$

In the following, modulation of a carrier placed at $\omega_0$ may indicate the conceptual mixing operation applied on a baseband equivalent $x(t)$ in order to transmit an RF signal $x_{RF}(t)=2 \text{Re}[x(t) e^{j\omega_0 t}]$.

In the following, a spectral contribution $X(\omega-\omega_0)$, related to a term $x(t) e^{j\omega_0 t}$, may be indicated as contribution X, centered around $\omega_0$.

A Radio Frequency (RF) signal $x_{RF}(t)$ may be expressed in terms of its components. For instance, considering only the components of interest, without loss of generality, the RF signal may be built in the following way:

$$x_{RF}(t) = 2\text{Re}[s(t)e^{j(\omega_{LO}+\omega_{IF})t} + i(t)e^{j(\omega_{LO}-\omega_{IF})t}]$$
$$= [s(t)e^{j\omega_{IF}t} + i(t)e^{-j\omega_{IF}t}]e^{j\omega_{LO}t} +$$
$$[s^*(t)e^{-j\omega_{IF}t} + i^*(t)e^{j\omega_{IF}t}]e^{-j\omega_{LO}t}$$

where:
- $s(t)$ indicates the complex baseband equivalent of the desired signal, transmitted in RF by modulating a carrier placed at $\omega_{RF}=\omega_{LO}+\omega_{IF}$;
- $i(t)$ indicates the complex baseband equivalent of the image signal, transmitted in RF by modulating a carrier placed at $\omega_{LO}-\omega_{IF}$;

the asterisk in apex (*) indicates complex conjugation, defined as: $x^*=\text{Re}(x)-j\text{Im}(x)$.

Applying the suitable substitution $x(t)=s(t) e^{j\omega_{IF}t} + i(t)e^{-j\omega_{IF}t}$, the RF signal can be expressed in the simplified form:

$$x_{RF}(t)=2 \text{Re}[x(t)e^{j\omega_{LO}t}]=x(t)e^{j\omega_{LO}t}+x^*(t)e^{-j\omega_{LO}t}$$

Figure 2A:
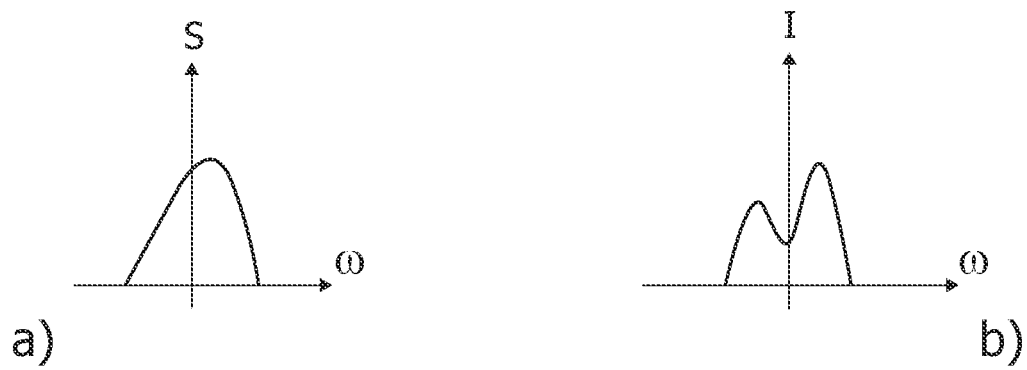
FIGS. 2A, 2B, 2C, are exemplary diagrams of possible behaviors of signal spectra in one or more embodiments.
Figure 2B:
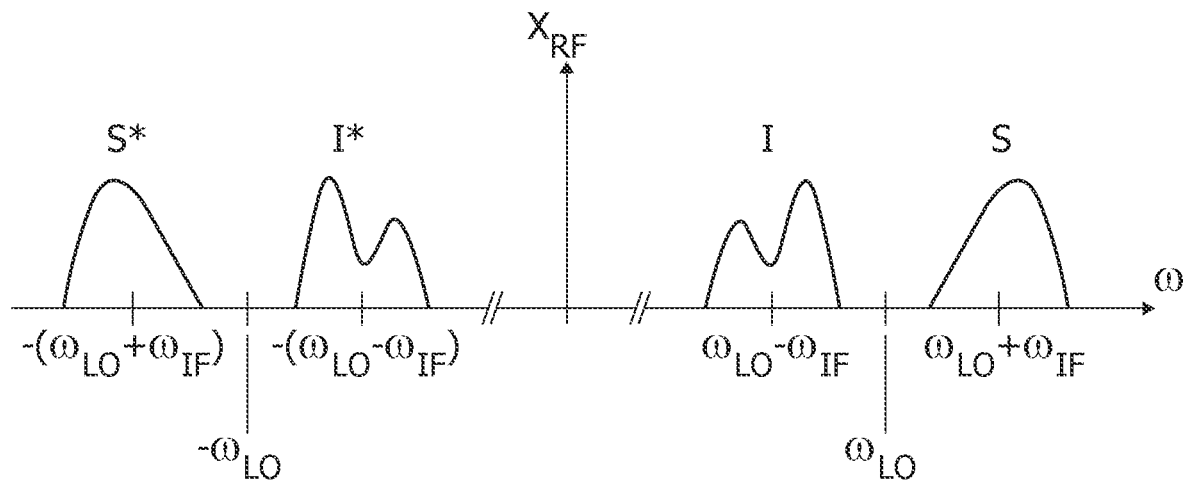

FIG. 2B may be exemplary of a diagram of RF signal contributions S, I, S* and I* in the domain of frequency (or spectral domain), obtained from the baseband equivalents S and I of FIG. 2A, respectively related to desired and image signals.

When analyzing the I/Q imbalance problem, three cases may be of interest:
- an "ideal" balanced case, for instance where no I/Q imbalance is present,
- a first imbalance case where I/Q imbalance may be considered frequency-independent, for instance constant in a certain frequency range,
- a second imbalance case where I/Q imbalance may be considered frequency-dependent, for instance varying as a function of frequency.

In the "ideal" balanced case, a (ideal) local oscillator (LO) signal $x_{LO}(t)$ may be expressed as:

$$x_{LO}(t)=x_{LO,I}(t)+jx_{LO,Q}(t)=e^{-j\omega_{LO}t}$$

where:
- $x_{LO,I}(t)$ indicates a first LO signal component, which may be expressed as $x_{LO,I}(t)=\cos(\omega_{LO} t)$;
- $x_{LO,Q}(t)$ indicates a second LO signal component, which may be expressed as $x_{LO,Q}(t)=\sin(\omega_{LO} t)$.

In the "ideal" balanced case, generated LO signal components have same amplitudes and are in quadrature therebetween, that is one is separated in phase by 90° (or $\pi/2$) with respect to the other.

Still in this "ideal" balanced case, the filter stages 16I, 16Q have respective impulse responses $h_{IF,I}(t)$, $h_{IF,Q}(t)$ (and transfer functions $H_{IF,I}(\omega)$, $H_{IF,Q}(\omega)$) which may be modeled as a nominal intermediate frequency low pass filter (briefly, IF-LPF) having likewise impulse response $h_{IF}(t)$ (and transfer function $H_{IF}(\omega)$) on both I and Q signal paths.

Therefore, such filter impulse responses (and respective transfer functions) may be expressed as:

$$h_{IF,I}(t)=h_{IF,Q}(t)=h_{IF}(t) \; H_{IF,I}(\omega)=H_{IF,Q}(\omega)=H_{IF}(\omega).$$

In the considered exemplary "ideal" balanced case, the IF complex signal $x_{IF}(t)$ may be expressed as:

$$x_{IF}(t)=h_{IF}(t)*[x_{RF}(t)x_{LO}(t)]=x(t)=s(t)e^{j\omega_{IF}t}+i(t)e^{-j\omega_{IF}t}$$

where the asterisk symbol (*) indicates the convolution between two continuous-time signals, which may be expressed as:

$$h(t)*x(t)=\int_{-\infty}^{\infty}h(\tau)x(t-\tau)d\tau.$$

Figure 1A:
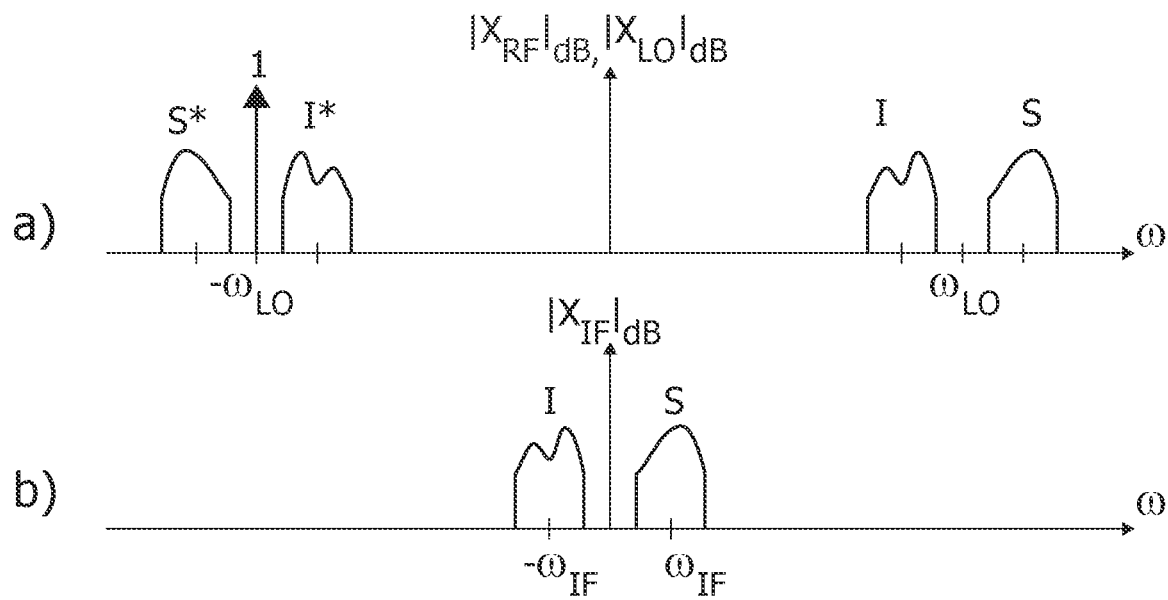
FIGS. 1A and 1B are exemplary of model signal spectra.

For instance, in the exemplary ideal case considered herein, as exemplified in FIG. 1A:
- contributions S, I of the RF signal $x_{RF}(t)$ and the oscillator signal $x_{LO}(t)$ may have frequency spectra $|X_{RF}(\omega)|_{dB}$, $|X_{LO}(\omega)|_{dB}$, as shown in portion a) of FIG. 1A,
- the I/Q down-converter 13 may provide a down-converted signal $x_{IF}(t)$ having a frequency spectrum $|X_{IF}(\omega)|_{dB}$, as exemplified in portion b) of FIG. 1A, wherein contributions S and I are placed at positive and negative IF frequency, respectively, ideally without any mutual overlap.

As a result of baseband mixing 24A, 24B and filtering 26A, 26B, performed in the discrete-time domain (after ADC conversion 18) in the second down-conversion stage 22, two baseband signals $s_{BB}$ and $i_{BB}$ (placed around zero-frequency) are obtained, wherein the signal component and the image component do not interfere therebetween.

Such baseband signals $s_{BB}$ and $i_{BB}$ may be expressed in the discrete-time domain k as:

$$s_{BB}(k) = h_{BB}(k) * [x_{IF}(kT)x_{NCO}(k)] = s(kT)$$

$$i_{BB}(k) = h_{BB}(k) * [x_{IF}(kT)x^*_{NCO}(k)] = i(kT)$$

where:
$X_{NCO}(k) = e^{j\omega_{IF}t}$ is the NCO signal,
$h_{BB}(k)$ is the impulse response of the baseband low-pass filter (BB-LPF) 26A, 26B, having transfer function $H_{BB}(\omega)$ in the frequency domain, and
the asterisk symbol (*) indicates the convolution between two discrete-time signals, defined as:

$$h(k) * x(k) = \sum_{n=-\infty}^{\infty} h(n)x(k-n).$$

In a more realistic case, for instance in the first imbalance case, I/Q imbalance may be present and may be constant in frequency.

In such an exemplary first imbalance case, the local oscillator signal $x_{LO}(t)$ may rather be expressed for instance as:

$$x_{LO,I}(t) = \cos(\omega_{LO}t);$$

$$x_{LO,Q}(t) = -g\sin(\omega_{LO}t + \phi)$$

$$x_{LO}(t) = x_{LO,I}(t) + j$$

$$x_{LO,Q}(t) = K_1 e^{-j\omega_{LO}t} + K_2 e^{j\omega_{LO}t}$$

wherein:

$$K_1 = \frac{1 + ge^{-j\phi}}{2}$$

$$K_2 = \frac{1 - ge^{j\phi}}{2}$$

where g is the gain imbalance, $\phi$ is the phase imbalance and $K_1$, $K_2$ are the mismatch coefficients: in the "ideal" case, $K_1=1$, $K_2=0$; typically, $|K_2| << |K_1| \cong 1$.

As a result, at the output of the RF-IF stage 21 of the receiver 10, the IF signal $x_{IF}$ may be expressed as a function of time t as:

$$x_{IF}(t) = h_{IF}(t) * [x_{RF}(t)x_{LO}(t)] = K_1 x(t) + K_2 x^*(t) =$$

$$K_1[s(t)e^{j\omega_{IF}t} + i(t)e^{-j\omega_{IF}t}] + K_2[s^*(t)e^{-j\omega_{IF}t} + i^*(t)e^{j\omega_{IF}t}] = [K_1 s(t) + K_2 i^*(t)]e^{j\omega_{IF}t} + [K_1 i(t) + K_2 s^*(t)]e^{-j\omega_{IF}t}.$$

Figure 1B:
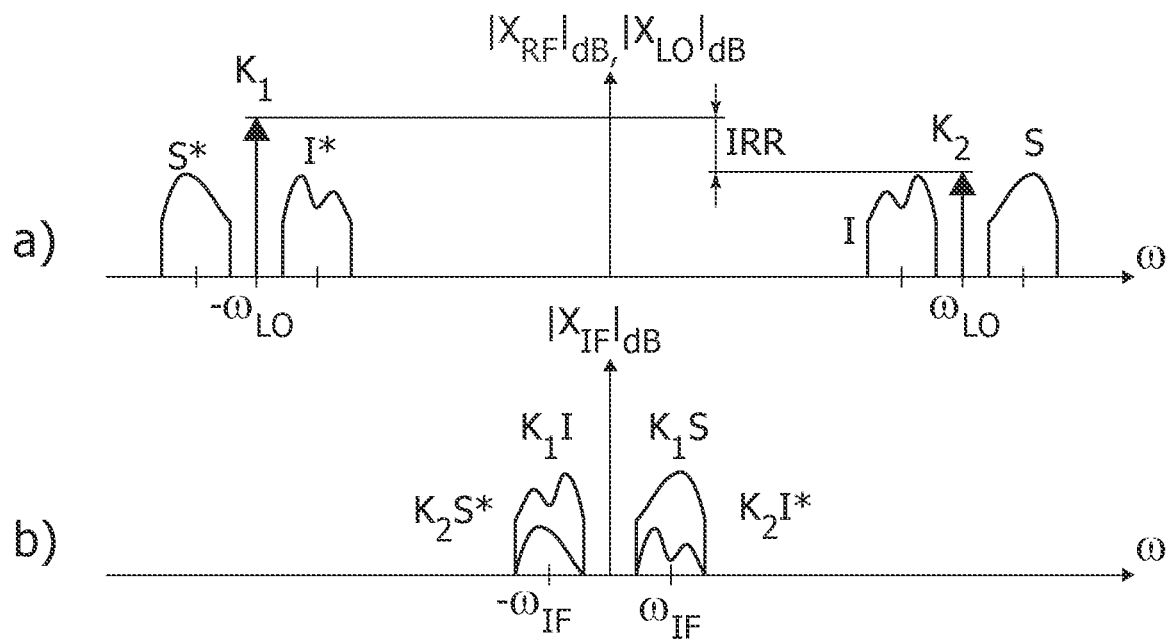

For instance, in the exemplary first imbalance case as considered herein, as exemplified in FIG. 1A:
contributions S, I of the RF signal $x_{RF}(t)$ and the oscillator signal $x_{LO}(t)$ may have frequency spectra $|X_{RF}(\omega)|_{dB}$, $|X_{LO}(\omega)|_{dB}$, as shown in portion a) of FIG. 1B,
as exemplified in portion b) of FIG. 1B, the down-converter mixer 13 may provide a down-converted IF signal $x_{IF}(t)$ having a frequency spectrum $|X_{IF}(\omega)|_{dB}$;

wherein around $\omega_{IF}$ a first contribution $K_1$ S may be overlapped with a second contribution $K_2$ I*; vice versa, around $-\omega_{IF}$, a third contribution $K_1$ I may be overlapped with a fourth contribution $K_2$ S*.

As a consequence, in the exemplary first imbalance case as discussed herein, the desired signal s(t) and the image signal i(t) may be mixed indistinguishably, introducing unwanted cross-interference.

Such an interference may propagate and be observed also in the baseband signals $s_{BB}$, $i_{BB}$, produced by the IF-BB down-conversion stage 22. For instance, baseband signals $s_{BB}$, $i_{BB}$ may be expressed as:

$$s_{BB}(k) = h_{BB}(k) * [x_{IF}(kT)X_{NCO}(k)] = K_1 s(kT) + K_2 i^*(kT)$$

$$i_{BB}(k) = h_{BB}(k) * [x_{IF}(kT)x^*_{NCO}(k)] = K_1 i(kT) + K_2 s^*(kT)$$

I/Q imbalance may lead to crosstalk between wanted signal and image signal, whose amount can be quantified by coefficients ratio $K_2/K_1^*$.

As mentioned, in the considered example of the first imbalance case, such I/Q imbalance here considered is frequency-independent, because this ratio is related only to the (constant) coefficients $K_1$ and $K_2$.

In the second imbalance case, filter impulse responses $h_{IF,I}(t)$, $h_{IF,Q}(t)$ (or transfer functions $H_{IF,I}(\omega)$, $H_{IF,Q}(\omega)$, in frequency domain) of the respective I/Q signal paths 16I and 16Q may have a mismatch with respect to the impulse response $h_{IF}(t)$ (or, similarly, the related transfer function $H_{IF}(\omega)$) of the nominal IF-LPF.

For instance, in the second imbalance case, such filter impulse responses (and respective transfer functions) may be expressed as:

$$h_{IF,I}(t) = h_I(t) * h_{IF}(t) \quad h_{IF,Q}(t) = h_Q(t) * h_{IF}(t)$$

$$H_{IF,I}(\omega) = H_I(\omega)H_{IF}(\omega) \quad H_{IF,Q}(\omega) = H_Q(\omega)H_{IF}(\omega)$$

where $h_I(t)$, $h_Q(t)$ represent, in time domain, the effect of mismatch on I and Q branches, with respect to the nominal IF-LPF, and $H_I(\omega)$, $H_Q(\omega)$ represent like mismatch expressed as a function of frequency.

In this second imbalance case, as a result of down-conversion 13, the IF signal components $x_{IF,I}(t)$, $X_{IF,Q}(t)$ may be expressed as:

$$x_{IF,I}(t) = h_{IF,I}(t) * [x_{RF}(t)x_{LO,I}(t)] = h_I(t) * \frac{x(t) + x^*(t)}{2}$$

$$x_{IF,Q}(t) = h_{IF,Q}(t) * [x_{RF}(t)x_{LO,Q}(t)] = gh_Q(t) * \frac{x(t)e^{-j\phi} - x^*(t)e^{j\phi}}{2j}$$

and their combination, in the combiner 17, may be expressed as:

$$x_{IF}(t) = x_{IF,I}(t) + jx_{IF,Q}(t) = k_1(t) * x(t) + k_2(t) * x^*(t) =$$

$$k_1(t) * [s(t)e^{j\omega_{IF}t} + i(t)e^{-j\omega_{IF}t}] + k_2(t) * [s^*(t)e^{-j\omega_{IF}t} + i^*(t)e^{j\omega_{IF}t}]$$

where $$k_1(t) = \frac{h_I(t) + ge^{-j\phi}h_Q(t)}{2}$$

$$k_2(t) = \frac{h_I(t) - ge^{j\phi}h_Q(t)}{2}$$

represent the mismatch impulse responses.

A similar analysis for this exemplary second imbalance case may be performed in the frequency domain, yielding the following expression for IF signal spectrum $X_{IF}$:

$$X_{IF}(\omega) = $$
$$K_1(\omega) \ X(\omega) + K_2(\omega) \ X^*(-\omega) = K_1(\omega) \ [S(\omega - \omega_{IF}) + I(\omega - \omega_{IF})] +$$
$$K_2(\omega) \ [S^*(-\omega - \omega_{IF}) + I^*(\omega - \omega_{IF})]$$

wherein $$K_1(\omega) = \frac{H_I(\omega) + g \ e^{-j\phi} \ H_Q(\omega)}{2} \quad K_2(\omega) = \frac{H_I(\omega) - g \ e^{j\phi} \ H_Q(\omega)}{2}$$

represent mismatch transfer functions, which may vary as a function of frequency.

A ratio $K_2(\omega)/K^*_1(\omega)$ involving mismatch transfer functions $K_1(\omega)$, $K_2(\omega)$ may be indicative of the amount of introduced cross-talk. This ratio $K_2(\omega)/K^*_1(-\omega)$ may vary, in general, as a function of frequency. The I/Q imbalance here considered may be, in general, frequency-dependent.

It is noted that in a special case wherein mismatch transfer functions are equal, e.g., $H_I(\omega)=H_Q(\omega)$, it is possible to retrieve a frequency-independent I/Q imbalance, characterized by $K_2(\omega)/K^*_1(-\omega)=K_2/K^*_1$, as in the case with nominal $H_{IF}(\omega)$ (a difference lying in that mismatches with respect to the nominal $H_{IF}(\omega)$ could be responsible, in any case, of small distortions).

A cause of frequency-dependent I/Q imbalance, as in the second imbalance case scenario, involves time delay $\tau$ of "Q" signal path 16Q, for example, with respect to "I" signal path 16I. Such a time delay is related to signal path mismatches which may be expressed by the respective impulse responses $h_I(t)$, $h_Q(t)$ and the corresponding transfer functions $H_I(\omega)$, $H_Q(\omega)$ as follows:

$$h_I(t)=\delta(t) \ h_Q(t)=\delta(t-\tau)$$

$$H_I(\omega)=1 \ h_Q(\omega)=e^{-j\omega\tau}$$

wherein $\delta(t)$ is the Dirac delta function.

Still in the considered exemplary second imbalance case scenario, processing mismatched signals in the IF-BB down-conversion stage 22 may yield baseband signal spectra $s_{BB}(\omega)$, $I_{BB}(\omega)$ which, for instance for $|\omega T|\leq\pi$, may expressed as:

$$s_{BB}(\omega)=H_{BB}(\omega)X_{IF}(\omega+\omega_{IF})=K_1(\omega+\omega_{IF})S(\omega)+K_2(\omega+\omega_{IF})I^*(-\omega)$$

$$I_{BB}(\omega)=H_{BB}(\omega)X_{IF}(\omega-\omega_{IF})=K_1(\omega-\omega_{IF})I(\omega)+K_2(\omega-\omega_{IF})S^*(-\omega).$$

As mentioned, solutions for improving detection and correction of such I/Q imbalance errors may facilitate to achieve a satisfactory level of performance of a signal processing system comprising a wideband receiver 20.

As mentioned, the ratio $K_2/K^*_1$ may be used to quantify the crosstalk phenomenon, in terms of leakage amount. Other indicators based on the mismatch coefficients $K_1$, $K_2$ can be used as well.

For instance, the so-called Image Rejection Ratio (briefly, IRR) is a relevant figure of merit of such receiver RFFE architectures 20, providing an indication of the amount of attenuation achieved inside the front-end, relatively to the crosstalk phenomenon.

Such an IRR parameter may be evaluated at the output of the RF-IF down-conversion stage 21 and expressed as follows:

in the first imbalance case (frequency-independent):

$$IRR = 10 \ \log_{10} \frac{|K_1|^2}{|K_2|^2}$$

in the second imbalance case (frequency-dependent):

$$IRR(\omega) = 10 \ \log_{10} \frac{|K_1(\omega)|^2}{|K_2(\omega)|^2}.$$

For the sake of simplicity, exemplary embodiments are discussed in the following mainly with respect to the case wherein I/Q imbalance is constant in frequency (first imbalance case scenario), being otherwise understood that such a discussion is purely exemplary and in no way limiting.

One or more embodiments may be particularly suited to deal with I/Q imbalance which varies with respect to frequency, for instance in the second imbalance case scenario.

In such an exemplary first imbalance case scenario, as exemplified in portion b) of FIG. 1B, one or more embodiments may facilitate extracting a desired signal S from the received RF signal, for instance using decorrelation techniques such as symmetric adaptive decorrelation (briefly, SAD) or blind source separation, as discussed in the following.

Known analog techniques aiming to remove or attenuate such a parasitic effect may facilitate obtaining values of IRR parameter approximately of the order of 30 to 40 dB.

Modern radio applications may highly benefit from values of IRR of about 80 dB or more, which may be achieved thanks to digital algorithms.

For instance, in heterodyne radio receivers, applying digital decorrelation algorithms after the analog front-end, may reduce the effects of I/Q imbalance for narrowband receivers.

Specifically, a Symmetric Adaptive Decorrelation (SAD) algorithm, for instance as disclosed in S. Van Gerven and D. Van Compernolle, "Signal Separation by Symmetric Adaptive Decorrelation: Stability, Convergence, and Uniqueness", *IEEE Trans. Signal Processing*, vol. 43, no. 7, pp. 1602-1612, July 1995, may be found suitable for use in narrowband receivers.

A SAD technique may hardly be a feasible for use with wideband receivers, due to lack of efficiency and effectiveness, e.g., due to the presence of a strongly high frequency-dependent I/Q imbalance.

As mentioned in the foregoing, for narrowband receivers the I/Q imbalance can be considered constant versus frequency, as discussed with respect to the first imbalance case, while in a wideband radio receiver the I/Q imbalance can have strong variations as a function of frequency, as discussed with respect to the second (frequency-dependent) imbalance case.

Figure 2C:
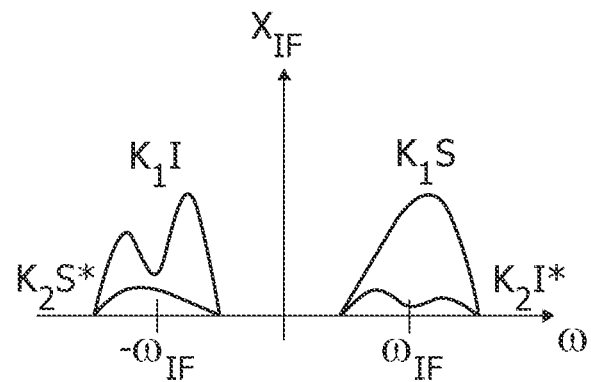

FIGS. 2A, 2B and 2C are exemplary diagrams of possible frequency spectra which may be processed as exemplified herein, for instance in a first case of (frequency-independent) I/Q imbalance.

For instance:

FIG. 2A comprises two portions a) and b), wherein:

portion a) is an exemplary diagram of a baseband equivalent spectrum S of a desired signal $S(\omega)$ (expressed in time domain as s(t)), and portion b) is an exemplary diagram of a baseband equivalent spectrum I of an image signal $I(\omega)$ (expressed in time domain as i(t));

FIG. 2B is an exemplary diagram of an RF signal spectrum $X_{RF}$ of a received RF signal $X_{RF}(\omega)$ (expressed in time domain as $x_{RF}(t)$), wherein the RF signal spectrum $X_{RF}$ comprises:

a first pair of desired signal spectral contributions S, S*, placed around $\pm(\omega_{LO}+\omega_{IF})$, respectively, a second pair of image signal spectral contributions I, I*, placed around $\pm(\omega_{LO}-\omega_{IF})$, respectively;

FIG. 2C is an exemplary diagram of an IF signal spectrum $X_{IF}$ of an IF signal $X_{IF}(\omega)$ (expressed in time domain as $x_{IF}(t)$) which may be obtained as a result of signal processing 13, 21, wherein the IF signal spectrum $X_{IF}$ comprises:

a first IF signal spectrum portion which may be placed around a first "positive" IF frequency $\omega_{IF}$, the first IF signal spectrum portion comprising a superposition of a first spectral contribution $K_1$ S and a second spectral contribution $K_2$ I*, wherein the first spectral contribution $K_1$ S may be a result of the product of a first mismatch coefficient $K_1$ with a first desired signal spectral contribution S, and wherein the second spectral contribution $K_2$ I* may be a result of the product of a second mismatch coefficient $K_2$ with a second image signal spectral contribution I*;

a second IF signal spectrum portion which may be placed around a second "negative" IF frequency $\omega_{IF}$ opposed said first "positive" frequency, the second IF signal spectrum portion comprising a superposition of a third spectral contribution $K_1$ I and a fourth spectral contribution $K_2$ S*, wherein the third spectral contribution $K_1$ I may be a result of the product of a first mismatch coefficient $K_1$ with a first image signal spectral contribution I, and wherein the fourth spectral contribution $K_2$ S* may be a result of the product of a second mismatch coefficient $K_2$ with a second desired signal spectral contribution S*.

In general, in the second imbalance case wherein I/Q imbalance may vary with frequency such as in wideband receivers, applying SAD technique may yield unsatisfactory performances limited by decorrelation time of clean source signals (desired and image signals, without crosstalk). Specifically, SAD may be inefficient when the loop operates at a high sampling rate as in the case of wideband receivers, wherein the decorrelation time could be higher than the sampling period.

As discussed herein, "narrowband" may refer to a receiver in which the bandwidth of interest within the RF signal (e.g., suitable bandwidth for successive baseband processing, after down-conversion to IF and analog-to-digital conversion) is (significantly) lower (e.g., by a factor of at least 10) with respect to the analog bandwidth of the system, limited by the IF stage 21. Otherwise, the receiver is considered "wideband".

Figure 3:
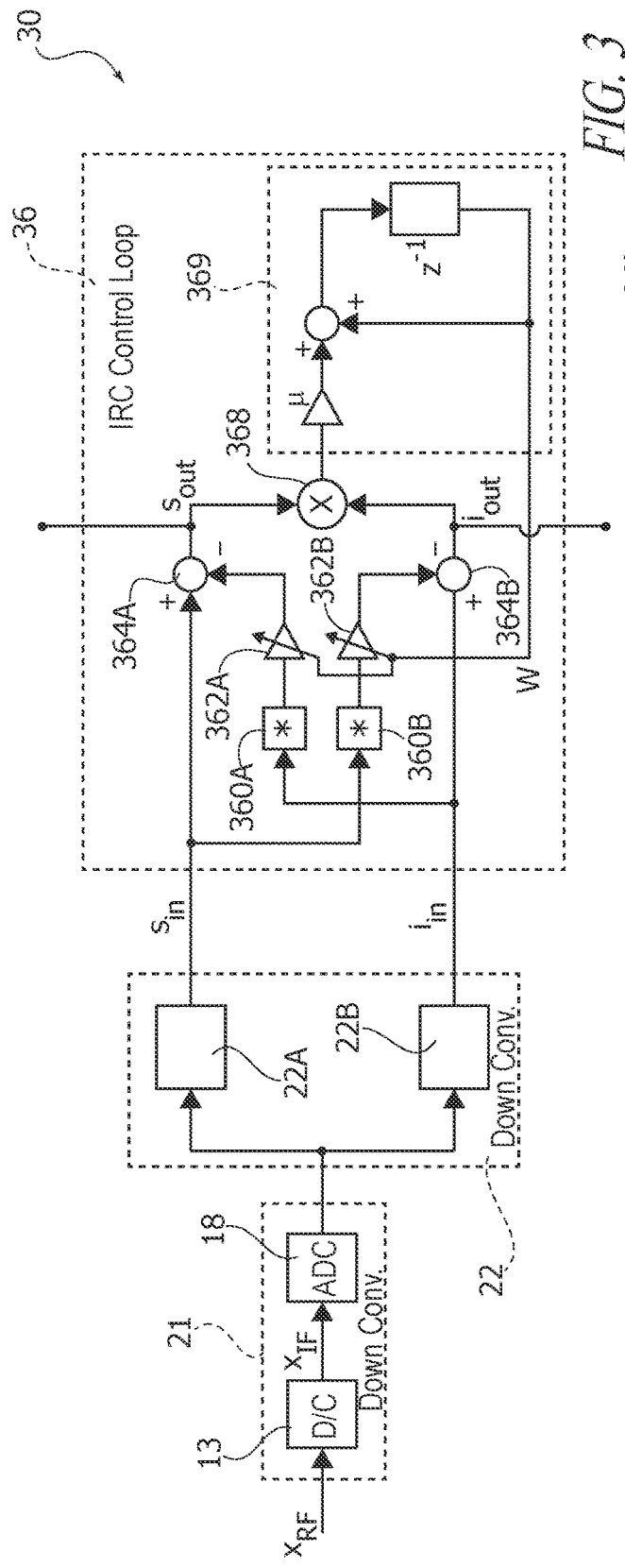
FIG. 3 is an exemplary diagram of a method as per the present disclosure, in double-branch IRC structures.

FIG. 3 is exemplary of a method for image rejection correction (briefly, IRC), comprising an IRC control loop stage 36, configured to adjust at least one complex coefficient value w(k), in order to get to an expected value $E[s_{out}(k) i_{out}(k)]=0$, as discussed in the following.

Specifically, one or more embodiments, as exemplified in FIG. 3, may be useful when a non-zero intermediate frequency is used, e.g., $\omega_{IF} \neq 0$ Hz, and when IRC is performed on baseband signals. As a result, as discussed in the following, an IRC processing stage may be coupled to baseband stages, which follow a second down-conversion stage 22.

Unless otherwise discussed in the following, in FIG. 3 (and in FIGS. 4 and 5 as well) parts or elements like parts or elements already discussed in the foregoing are indicated with like reference/numerals, so that a corresponding detailed description will not be repeated here for brevity.

In one or more embodiments as exemplified in FIG. 3, a (double-branch) crosstalk correction system 30 may comprise:

an RF input node $x_{RF}$, configured to receive an RF signal $x_{RF}(t)$, e.g., carrying multiple channels of data desired by a user, a first down-conversion stage 21, e.g., an analog down-conversion stage, coupled to the RF input node $x_{RF}$ and configured to receive therefrom the RF signal, to multiply the RF signal $x_{RF}(t)$ with the components $x_{LO,I}(t)$, $X_{LO,Q}(t)$ of a local oscillator (LO), having a frequency $\omega_w$, and low-pass filter the resulting signals, hence generating respective $x_{IF,I}(t)$ and $X_{IF,Q}(t)$ signal components;

a second down-conversion stage 22, e.g., a digital down-conversion stage, coupled to the first down-conversion stage 21 and configured to receive therefrom sampled versions $x_{IF,I}(kT)$ and $X_{IF,Q}(kT)$ of the respective signal components and to apply digital complex processing thereto, thus providing complex baseband signals $s_{BB}(k)$, $i_{BB}(k)$, an image rejection correction (IRC) control loop 36 coupled to the second down-conversion stage 22 and configured to receive a pair of (sampled) signals $s_{in}$, $i_{in}$, for instance expressed as $s_{in}(k)=s_{BB}(kM)$, $i_{in}(k)=i_{BB}(kM)$, where M is a suitable decimation factor, the IRC control loop 36 configured to apply image rejection correction processing 36 to such pair of (sampled) signals $s_{in}$, $i_{in}$, facilitating decorrelating a desired signal component $s_{out}(k)$ and an image signal component $i_{out}(k)$ therebetween, as discussed in the following.

As mentioned, in one or more embodiments, the components in FIG. 3 may operate partially in the analog domain and partially in the digital domain.

In one or more embodiments, the ADC stage 18 in the first down-conversion stage 21 may comprise a first ADC coupled to the I signal path filter 16I and a second ADC coupled to the Q signal path filter 16Q and configured to convert from analog to digital the respective I and Q signal components of the down-converted signal $x_{IF}(kT)$.

In one or more embodiments as exemplified in FIG. 3, crosstalk parasitic effects, originating from the analog down-conversion implemented in the first down-conversion stage 21, may be spectrally shifted to baseband in the second down-conversion stage 22, the latter employing digital techniques for the related down-conversion processing of complex signals and, therefore, without introducing further crosstalk contributions.

Figure 4:
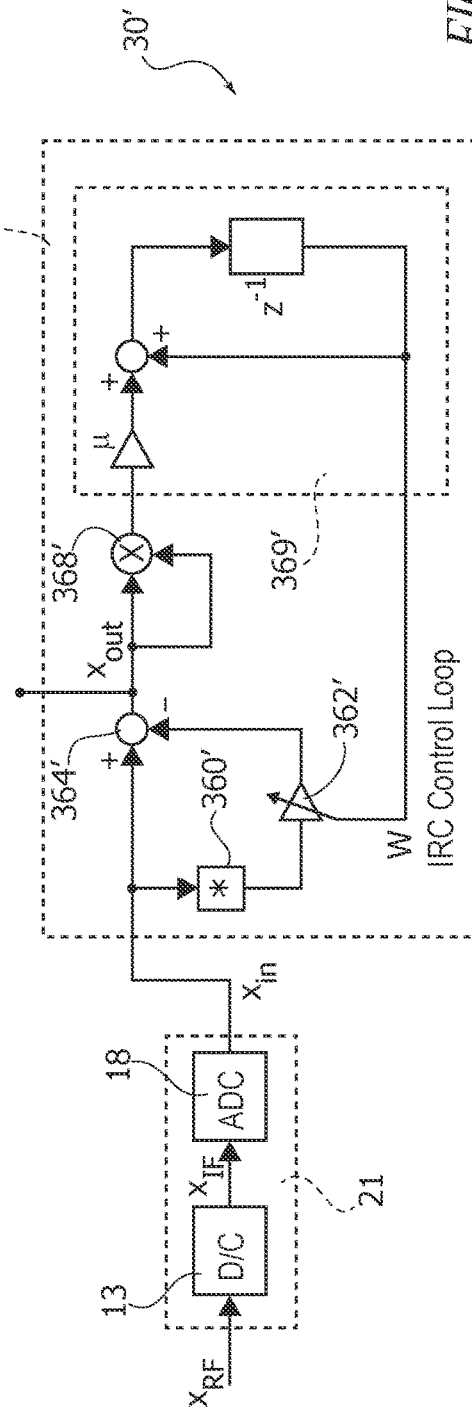
FIG. 4 is an exemplary diagram of a method as per the present disclosure, in single-branch IRC structures.

Alternatively, in one or more embodiments as exemplified in FIG. 4 and discussed in the foregoing, crosstalk parasitic effects, originating from a direct down-conversion implemented in the first down-conversion stage 21, may directly affect baseband.

Figure 3A:
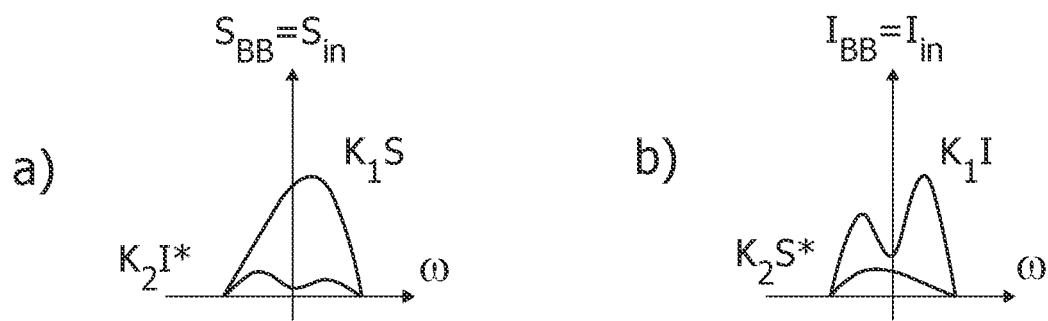
FIGS. 3A, 3B, 4A, 4B and 4C are exemplary diagrams of possible behaviors of signal spectra in one or more embodiments.

FIG. 3A is a diagram exemplary of possible input signal spectra $s_{in}$, $I_{in}$ for the (double-branch) IRC control loop 36, as discussed in the following.

As mentioned, due to I/Q imbalance generated in the first (analog) down-conversion stage 21, output signals from the second down-conversion stage 22, as exemplified in FIG. 3A, may comprise a superposition of a first signal proportional to the expected/desired signal, e.g., $K_1$ S, as well as a second signal proportional to a conjugated version of an other/image signal, e.g., $K_2$ I*.

Specifically:

portion a) of FIG. 3A is exemplary of a first input (complex) signal spectrum $s_{in}$ comprising a superposition of a first spectral contribution $K_1$ S and a second spectral contribution $K_2$ I*, wherein the first spectral contribution $K_1$ S may be a result of the product of a first mismatch coefficient $K_1$ with a first desired signal spectral contribution S, and wherein the second spectral contribution $K_2$ I * may be a result of the product of a second mismatch coefficient $K_2$ with a second image signal spectral contribution I*;

portion b) of FIG. 3A is exemplary of a second input (complex) signal spectrum $I_{in}$ comprising a superposition of a third spectral contribution $K_1$ I and a fourth spectral contribution $K_2$ S*, wherein the third spectral contribution $K_1$ I may be a result of the product of a first mismatch coefficient $K_1$ with a first image signal spectral contribution I, and wherein the fourth spectral contribution $K_2$ S* may be a result of the product of a second mismatch coefficient $K_2$ with a second desired signal spectral contribution S*.

In one or more embodiments as exemplified in FIG. 3, the (double-branch) IRC control loop 36 may comprise:

a first input node $s_{in}$ and a second input node $i_{in}$, wherein the first input node $s_{in}$ is configured to receive a first complex signal $s_{in}(k)$ (for example, decimated by a factor M) from the second down-conversion stage 22, for instance a first signal expressed as $s_{in}(k)=s_{BB}(kM)$; the second input node $i_{in}$ is configured to receive a second complex signal $i_{in}(k)$ (for example, decimated by a factor M) from the second down-conversion stage 22, for instance a second signal expressed as $i_{in}(k)=i_{BB}(kM)$;

a first conjugating stage 360A and a second conjugating stage 360B, the first conjugating stage 360A being coupled to first input node $s_{in}$ and configured to provide a first conjugated complex signal $s^*_{in}(k)$, and the second conjugating stage 360B being coupled to the second input node $i_{in}$ and configured to provide a second conjugated complex signal $i^*_{in}(k)$;

a first adaptive multiplier (or filter) 362A and a second adaptive multiplier (or filter) 362B having multiplication/filtering coefficients as discussed in the foregoing, the first adaptive multiplier 362A being coupled to first conjugating stage 360A and the second adaptive multiplier 362B being coupled to second conjugating stage 360B;

a first adder stage 364A and a second adder stage 364B, the first adder stage 364A being coupled to the input node $s_{in}$ and to the output of the first multiplier stage 362A, and the second adder stage 364B being coupled to the second input node $i_{in}$ and to the output of the second multiplier stage 364B, a feedback branch 368, 369 coupled to the first and second adder stages 364A, 364B and to the first and second adaptive multiplier stages 362A, 362B, the feedback branch 368, 369 configured to vary or adapt multiplier stage coefficients as discussed in the following, a first output node $s_{out}$ and a second output node $i_{out}$, the first output node $s_{out}$ being coupled to the output node of the first adder stage 364A and the second output node $i_{out}$ being coupled to the output node of the second adder stage 364B.

In one or more embodiments, the first and second adder stages 364A, 364B may comprise circuitry configured to add a plurality of input signals therebetween and to output respective (combined) output signals at respective output nodes $s_{out}$, $i_{out}$.

In one or more embodiments, the feedback branch 368, 369 may be configured to provide coefficients to the first and/or second multiplier stages 362A, 362B as discussed in the following so that a suitable signal may be injected in the signal paths in order to compensate and cancel out unwanted signals due to parasitic cross-interference or I/Q imbalance.

In one or more embodiments, the feedback branch 368-369 may comprise circuitry, logic, and/or code configured to determine at least one coupling coefficient w indicative of coupling between received signals.

In one or more embodiments, the at least one complex coefficient w of the multiplier stages 362A, 362B may be computed in the IRC control loop 36, as discussed in the following.

For instance, in one or more embodiments as exemplified in FIG. 3, the feedback branch 368, 369 may comprise:

a correlator stage 368, for instance a multiplier operable as correlator, coupled to the output of the first adder 364A and to the output of the second adder 364B, and a loop filter stage 369 configured to determine the complex coupling coefficients, to provide such coefficients to the first and second multipliers 362A, 362B, in order to configure them to generate output signals that may cancel superimposed signals (due to cross-interference) when subtracted to the signals input at the adders 364A, 364B.

In one or more embodiments, processing 36 may be performed in the assumption that the desired signal and the conjugated of the image signal (or, equivalently, the image signal and the conjugated of the desired signal) are uncorrelated, which may be expressed as:

$$E[s(t)(i^*(t))^*]=E[i(t)(s^*(t))^*]=E[s(t)i(t)]=0.$$

As mentioned, mixing and filtering operations in the first down-conversion stage 21 may cause spectral overlap between desired signal and image signal components s(t), i(t), resulting in non-zero cross-interference, while mixing in the second down-conversion stage 22 may shift these effects to baseband, for instance on signals $s_{BB}(k)$, $i_{BB}(k)$, which may be applied to IRC control loop 36 input nodes $s_{in}$, $i_{in}$.

For instance, in one or more embodiments before starting compensation processing, the feedback branch correlator/multiplier 368 may receive:

the desired signal $K_1$ s(kMT), corrupted by a superimposed version of the image signal $K_2$ i*(kMT);

the image signal $K_1$ i(kMT), corrupted by a superimposed version of the desired signal $K_2$ S*(kMT).

In one or more embodiments, the IRC control loop stage 36 may decorrelate the desired signal $K_1$ s(kMT), corrupted by a conjugated version of the image signal $K_2$ i*(kMT), from the image signal $K_1$ i(kMT), corrupted by a conjugated version of the desired signal $K_2$ S*(kMT), such that the estimates at the IRC outputs are uncorrelated, in order to get to an expected value $E[s_t(k) i_{out}(k)]=0$.

In one or more embodiments, the at least one complex coupling coefficient w between signals may be determined utilizing decorrelation techniques, and the desired signal may be extracted using the determined coefficient w.

In one or more embodiments as exemplified by the related spectra in FIG. 3A, signals at the respective first and second input nodes $s_{in}$, $i_{in}$ of the IRC control loop 36 may be expressed as a function of discrete-time index k as:

$$s_{in}(k)=s_{BB}(kM)=K_1 s(kMT)+K_2 i^*(kMT)$$

$$i_{in}(k)=i_{BB}(kM)=K_1 i(kMT)+K_2 s^*(kMT)$$

where M is a suitable decimation factor, in particular in case baseband bandwidth may be substantially lower than IF bandwidth.

In one or more embodiments, applying IRC processing 36 to such input signals $s_{in}(k)$, $i_{in}(k)$ may be expressed with the following set of equations:

$$s_{out}(k)=s_{in}(k)-w(k)i^*_{in}(k)$$

$$i_{out}(k)=i_{in}(k)-w(k)s^*_{in}(k)$$

wherein w(k) is an expression in the discrete-time domain for the at least one coupling coefficient w whose value may vary, being computed and updated in time as a result of the feedback branch 368, 369 in the IRC control loop stage 36. For instance, the at least one coupling coefficient w may have its value updated according to an update function which may be expressed in discrete-time domain as:

$$w(k+1)=w(k)+\mu s_{out}(k)i_{out}(k)$$

wherein μ is a multiplication factor which may be set in the loop filter 389.

In one or more embodiments, the update function may depend on an estimated residual correlation between output signals at a given discrete-time moment, for instance output signals $s_{out}(k)$ and $i^*_{out}(k)$ (or, equivalently, $i_{out}(k)$ and $s^*_{out}(k)$). For instance, such residual correlation may be estimated as a result of integrating increments generated from a product of output signals, for instance $s_{out}(k) i_{out}(k)$.

In one or more embodiments, a steady-state condition may be reached for a given expected value condition, e.g., $E[s_{out}(k) i_{out}(k)]=0$, wherein such condition may yield a satisfactory coefficient value equal to the ratio between mismatch coefficients, for instance $w=K_2/K^*_1$.

Correspondingly, output signals $s_{out}$, $i_{out}$ may be expressed in discrete-time domain k as:

$$s_{out}(k) = K_1\left(1 - \frac{|K_2|^2}{|K_1|^2}\right)s(kMT) \quad i_{out}(k) = K_1\left(1 - \frac{|K_2|^2}{|K_1|^2}\right)i(kMT).$$

Figure 3B:
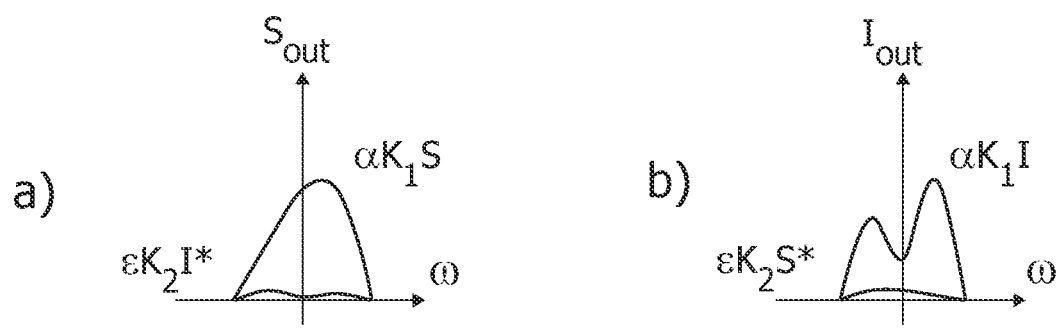

FIG. 3B is an exemplary diagram of possible frequency spectra of output signals which may be found at output nodes $s_{out}$, $i_{out}$, for instance while IRC control loop processing 36 is ongoing.

Specifically:
portion a) of FIG. 3B is a diagram of an exemplary frequency spectrum of a first output signal $s_{out}(\omega)$ (expressed as $s_{out}(k)$ in discrete-time domain), comprising a superposition of a first attenuated spectral contribution $\alpha K_1 S$ and a second attenuated spectral contribution $\varepsilon K_2 I^*$, and portion b) of FIG. 3B is a diagram of an exemplary frequency spectrum of a second output signal $I_{out}(\omega)$ (expressed as $i_{out}(k)$ in discrete-time domain), comprising a superposition of a third attenuated spectral contribution $\alpha K_1 I$ and a fourth attenuated spectral contribution $\varepsilon K_2 S^*$, wherein attenuation factors ε, α values may be indicative of the IRC control loop processing 36 facilitating reaching a steady-state condition in which attenuation factors ε, α tend to reach zero and one, respectively, for instance expressed as:

$$\varepsilon = 0 \quad \alpha = 1 - \frac{|K_2|^2}{|K_1|^2} \cong 1.$$

In one or more embodiments as exemplified in FIG. 4, a single-branch crosstalk correction system 30' may comprise:
an input node $x_{RF}$ configured to receive an RF signal $x_{RF}(t)$, for instance the RF signal may be expressed as:

$$x_{RF}=2 \text{Re}[s(t)e^{j\omega_{LO}t}]=s(t)e^{j\omega_{LO}t}+s^*(t)e^{-j\omega_{LO}t}$$

a (analog) down-conversion stage 21, for instance a direct down-conversion stage 21 configured to shift the desired signal component to an intermediate frequency $\omega_{IF}$ which may be zero, for instance $\omega_{IF} \cong 0$ Hz; for instance the intermediate frequency IF signal may be expressed as:

$$x_{IF}=h_{IF}(t)*[x_{RF}(t)x_{LO}(t)]=K_1 s(t)+K_2 s^*(t)$$

a single-branch IRC control loop 36', discussed in the following, coupled to the down-conversion stage 21 and configured to receive a first input signal $x_{in}(k)$ therefrom, the input signal having the form:

$$x_{in}(k)=x_{IF}(kT)=K_1 x(kT)+K_2 x^*(kT)$$

wherein x(kT) is a sampled version of a signal x(t) which may be expressed as x(t)=s(t).

Figure 4A:
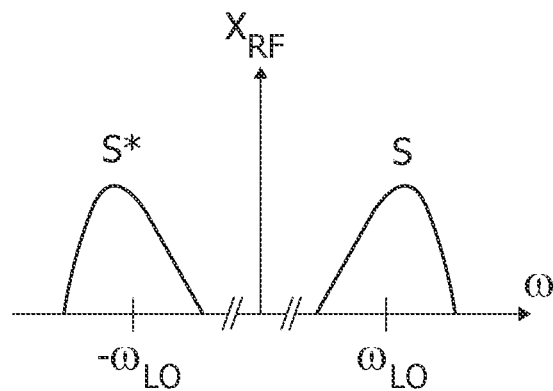

FIG. 4A is an exemplary diagram of a frequency spectrum $X_{RF}$ of an RF signal $X_{RF}(\omega)$ (expressed in time domain as $x_{RF}(t)$) which may be received at the input node $x_{RF}$ in the special case with $\omega_{IF}=0$, wherein such a frequency spectrum comprises a pair of desired signal contributions S, S* placed around frequencies $\pm\omega_{LO}$, respectively.

In one or more embodiments, the single-branch IRC control loop 36' may comprise:
a first input node $x_{in}$ configured to receive a first input signal $x_{in}(k)$ from the down-conversion stage 21, wherein the input signal $x_{in}(k)=x_{IF}(kT)$ may be expressed in the form:

$$x_{in}(k)=x_{IF}(kT)=K_1 x(kT)+K_2 x^*(kT)$$

wherein x(kT) is a sampled version of a signal x(t) which may be expressed as $x(t)=s(t)e^{j\omega_{IF}t}+i(t)e^{-j\omega_{IF}t}$;

a first conjugating stage 360' coupled to the first input node $x_{in}$ and configured to provide a first conjugated complex signal $x^*_{in}(k)$, a first adaptive multiplier (or filter) 362' having multiplication coefficient w, the first adaptive multiplier 362' being coupled to first conjugating stage 360', a first adder stage 364' being coupled to the input node $x_{in}$ and to the output node of the first multiplier stage 362', a feedback branch 368', 369' coupled to the first adder stages 364 and to the first adaptive multiplier stage 362, the feedback branch 368', 369' configured to vary or adapt multiplier stage coefficients as discussed in the following, a first output node $x_{out}$ coupled to the output node of the first adder stage 364'.

In one or more embodiments as exemplified in FIG. 4, the output signal $x_{out}(k)$ may be expressed as:

$$x_{out}(k)=x_{in}(k)-w(k)x^*_{in}(k)$$

wherein w(k) indicates at least one weight coefficient w expressed as a function of (discrete) time.

In one or more embodiments as exemplified in FIG. 4, feedback loop 368', 369' in the single-branch IRC control loop 36' in the single-branch circuit 30' may be configured to provide at least one weight coefficient w to configure the multiplier stage 362', to apply to the input signals such a coefficient whose value may vary in time according to the following expression:

$$w(k+1) = w(k) + \mu x_{out}(k)^2$$

wherein μ is a parameter which may be given in the loop filter 369' and which is used to multiply a squared output signal factor $x_{out}(k)^2$.

In one or more embodiments, for instance as exemplified in FIG. 4:
- a conjugating stage 360' may generate a conjugated signal $x^*_{in}(k)$,
- a correlator stage 368' may compute the squared output signal factor $x_{out}(k)^2$,
- a loop filter stage 369' may be coupled to the correlator stage 368' and configured to integrate such computed factor $x_{out}(k)^2$,
- a multiplier stage 362' may receive the at least one weight coefficient w(k) and the conjugated signal $x^*_{in}(k)$ to compute a product term $w(k) x^*_{in}(k)$ of the equation of the output signal expression,
- and adder node 364' may receive the product term $w(k) x^*_{in}(k)$ and the input signal $x_{in}(k)$, the first being subtracted from the latter and provided as an output of the adder node 364'.

One or more embodiments may employ a single-branch IRC control loop 36', wherein a single complex signal may be used for the update of the coefficients, estimating residual correlation between the output signal $x_{out}$ (k) and it conjugated version $x^*_{out}(k)$, thus as a function of integrating increments originated from $x_{out}(k)^2$.

In one or more embodiments, a steady-state condition may be reached for a given expected value condition, e.g., $E[x_{out}(k)^2] = 0$, which may yields, satisfactorily, the at least one weight coefficient w having a value equal to the ratio of the mismatch coefficients, e.g., $w = K_2/K^*_1$.

Correspondingly, the output signal $x_{out}$ may be expressed in discrete-time domain k as:

$$x_{out}(k) = K_1 \left(1 - \frac{|K_2|^2}{|K_1|^2}\right) x(kT).$$

Figure 4B:
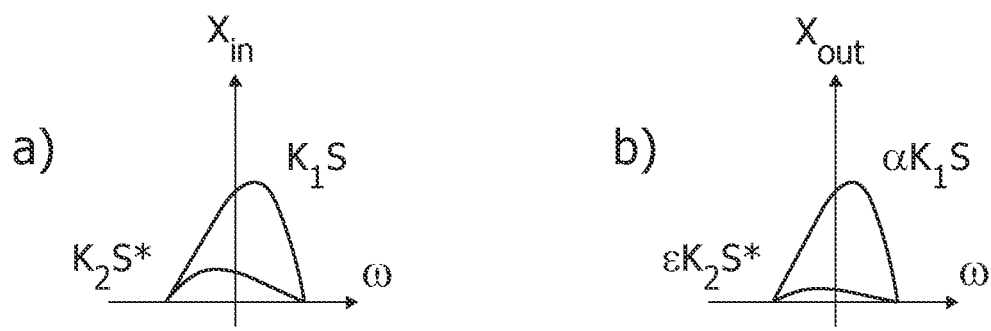

FIG. 4B is an exemplary diagram of possible frequency spectra of signals which may be processed in a (single-branch) IRC loop processing circuit 36'.

Specifically, for instance in the special case where IF frequency is zero, $\omega_{IF} = 0$:
- portion a) of FIG. 4B is a diagram of an exemplary frequency spectrum of a possible input signal $X_{in}(\omega)$ (expressed as $x_1(k)$ in discrete-time domain) which may be received at the input node $x_{in}$ of the IRC control loop 36', comprising a superposition of a first spectral contribution $K_1$ S and a second spectral contribution $K_2$ S*, and
- portion b) of FIG. 4B is a diagram of an exemplary frequency spectrum of a first output signal $X_{out}(\omega)$ (expressed as $x_{out}(k)$ in discrete-time domain), comprising a superposition of a first attenuated spectral contribution α $K_1$ S and a second attenuated spectral contribution ε $K_2$ S*, wherein attenuation factors ε, α values may be are indicative of the IRC control loop processing 36' facilitating reaching a steady-state condition in which attenuation factors ε, α tend to reach zero and one, respectively, for instance expressed as:

$$\varepsilon = 0 \quad \alpha = 1 - \frac{|K_2|^2}{|K_1|^2} \cong 1.$$

Figure 4C:
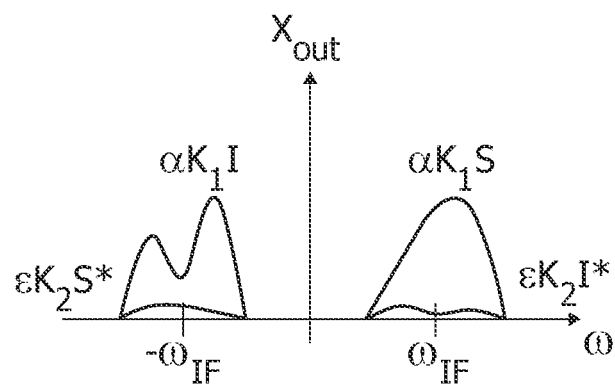

FIG. 4C is a further exemplary diagram of a possible frequency spectrum $X_{out}$ (a)) of an output signal $X_{out}(\omega)$ (expressed as $x_{out}(k)$ in discrete-time domain) which may be present at the output node $x_{out}$ while the IRC processing stage 36' may be ongoing, for instance as a result of processing the signal $x(t) = s(t) e^{j\omega_{IF}t} + i(t) e^{-j\omega_{IF}t}$, wherein the output signal $X_{out}(\omega)$ may comprise:
- a first signal spectrum portion which may be placed around a first "positive" IF frequency $\omega_{IF}$, the first IF signal spectrum portion comprising a superposition of a first attenuated spectral contribution α $K_1$ S and a second attenuated spectral contribution ε $K_2$ I*,
- a second signal spectrum portion which may be placed around a second "negative" IF frequency $-\omega_{IF}$ opposed said first "positive" frequency, the second IF signal spectrum portion comprising a superposition of a third attenuated spectral contribution α $K_1$ I and a fourth attenuated spectral contribution ε $K_2$ S*, wherein attenuation factors ε, α values may be are indicative of the IRC control loop processing 36' facilitating reaching a steady-state condition in which attenuation factors ε, α tend to reach zero and one, respectively, for instance expressed as:

$$\varepsilon = 0 \quad \alpha = 1 - \frac{|K_2|^2}{|K_1|^2} \cong 1.$$

In one or more embodiments, IRC control circuit 36, 36', 36" may comprise multi-tap processing, which may be particularly suited for compensating imbalance which may vary with frequency (see, for instance, the second imbalance case discussed in the foregoing).

It is noted that, for the sake of simplicity, one or more embodiments using multi-tap processing may be discussed mainly with respect to a single-branch IRC control loop 36', being otherwise understood that such a discussion is purely exemplary and in no way limiting.

For instance, in the single-branch IRC control loop 36', an input signal to be processed may be provided as $x_{in}(k) = x_{IF}(kT)$, having a corresponding frequency spectrum which may be expressed as:

$$X_{in}(\omega) = X_{IF}(\omega) = K_1(\omega)X(\omega) + K_2(\omega)X^*(-\omega) \quad |\omega T| < \pi.$$

In one or more embodiments, double-branch IRC control loop 36 processing may also comprise multi-tap processing, wherein input signals treated may be provided as $s_{in}(k) = s_{BB}(kM)$ and $i_{in}(k) = i_{BB}(kM)$, wherein corresponding signal spectra may be expressed as:

$$s_{in}(\omega) = s_{BB}(\omega) = K_1(\omega + \omega_{IF})S(\omega) + K_2(\omega + \omega_{IF})I^*(-\omega) \quad |\omega MT| \leq \pi$$

$$I_{in}(\omega) = I_{BB}(\omega) = K_1(\omega - \omega_{IF})I(\omega) + K_2(\omega - \omega_{IF})S^*(-\omega) \quad |\omega MT| \leq \pi.$$

Figure 5:
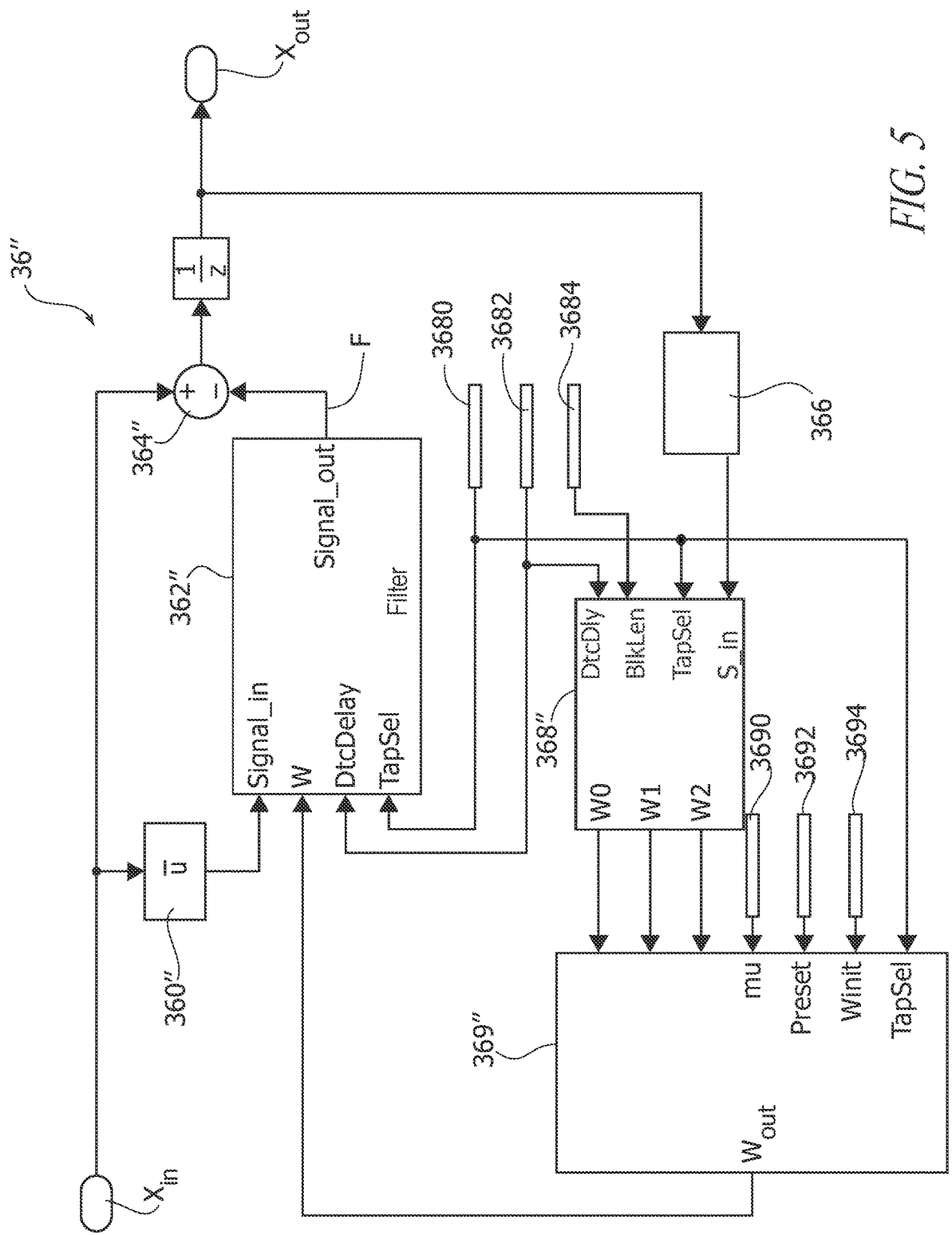
FIG. 5 is exemplary of a control loop arrangement as per the present disclosure.

In one or more embodiments as exemplified in FIG. 5, an IRC processing pipeline 36" may be configured to receive an input signal $X_{in}$ which may be expressed as a function of (discrete) time k and frequency ω, respectively, as:

$$x_{in}(k)=x_{IF}(kT)=[k_1(t)*x(t)]_{t=kT}+[k_2(t)*x^*(t)]_{t=kT}$$

$$X_{in}(\omega)=X_{IF}(\omega)=K_1(\omega)X(\omega)+K_2(\omega)X^*(-\omega) \quad |\omega T|\leq\pi.$$

One or more embodiments as exemplified in FIG. 5, may be particularly advantageous to deal with such an input signal $x_{in}(k)$, facilitating to deal with a (potentially) frequency-dependent I/Q imbalance.

In one or more embodiments as exemplified in FIG. 5, the multi-tap IRC control loop 36" may comprise:
- a first conjugating stage 360" coupled to the input node $x_{in}$ and configured to generate a conjugated input signal, for instance $x^*_{in}(k)$,
- an adaptive filter stage 362", for instance a Finite-duration Impulse Response (FIR) filter, coupled to the first conjugating stage 360 and configured to receive the conjugated input signal $x^*_{in}(k)$ therefrom and to compute an estimation of a signal interference term $x^*_2(k)$ which may be expressed as: $x^*_2(k)=[k_2(t)*x^*(t)]_{t=kT}$
- an adder stage 364, coupled to the input node, to the adaptive filter stage 362" and to an output node $x_{out}$,
- a feedback network 368", 369" coupled to the output node and to the FIR filter stage 362".

In one or more embodiments as exemplified in FIG. 5, the feedback network 368", 369" may comprise:
- a correlator stage 368", coupled to the output node and to the loop filter 369", the correlator stage 368" configured to compute an estimate of residual correlation $R_n(k)$, for instance a product of an output signal at a given time and an output signal after a given delay n, product which can be expressed as: $R_n(k)=x_{out}(k) x_{out}(k-n)$, $0\leq n<N$,
- a loop filter 369" coupled to the correlator stage 368" and to the FIR filter 362", the loop filter 369" configured to integrate such an estimate of residual correlation R and to update the set of coefficients W accordingly, as discussed in the following.

In one or more embodiments, a Finite-duration Impulse Response (FIR) filter 362" may comprise a filter whose impulse response (that is, the output in response to a Kronecker delta, or Dirac impulse, input) or response to any finite-length input, has a finite duration which may settle to zero in a limited/finite time.

For instance, a FIR filter of order N−1 may have an impulse response which may have a duration equal to a number N of (signal) samples before settling to zero, wherein samples N may be counted from first non-zero element through last non-zero element, with both included.

In one or more embodiments, the FIR filter 362" may comprise input delay line elements, facilitating to delay the input signal by a given number of samples.

In one or more embodiments employing a set W of N weight coefficients $w_0, w_1, w_2, \ldots, w_{N-1}$, an output signal $x_{out}(k)$, at the output node $x_{out}$ of the IRC control loop 36", may be computed as a result of applying adaptive FIR filtering 362", imposing decorrelation for N consecutive values of delay: $E[x_{out}(k)x_{out}(k-n)]=0, 0\leq n<N$.

Specifically, the output signal $x_{out}(k)$ may be expressed as:

$$x_{out}(k) = x_{in}(k) - \sum_{n=0}^{N-1} w_n(k) \, x_{in}^*(k - n)$$

whereas an update function of coefficients in the set of weight coefficients W may be expressed as:

$$w_n(k+1)=w_n(k)+\mu x_{out}(k)x_{out}(k-n) \quad 0\leq n<N.$$

In one or more embodiments as exemplified in FIG. 5, coefficients W may be applied to a subset of elements belonging to the delay line of the FIR 362", and decorrelation may be imposed solely for the related delay values.

For instance, the set of coefficients W may be applied to a comb of delay elements, the comb comprising a number $N_d$ of delay elements, the delay elements having distance d therebetween, wherein the distance d may be indicated as tap-delay distance or, simply, tap-delay.

In the example considered, imposing decorrelation may be expressed as:

$$E[x_{out}(k)x_{out}(k-d\,n)]=0, 0\leq n<N_d.$$

Still in the considered example, the output signal $x_{out}$ may be expressed as:

$$x_{out}(k) = x_{in}(k) - \sum_{n=0}^{N_d-1} w_n(k) \, x_{in}^*(k - d\,n)$$

and the update function of the set of coefficients W may be expressed as:

$$w_n(k+1)=w_n(k)+\mu x_{out}(k)x_{out}(k-d\,n) \quad 0\leq n<N_d.$$

In one or more embodiments as exemplified in FIG. 5, the set of coefficients W may comprise three coefficients $w_0, w_1, w_2$. For instance, such a number of coefficients may be particularly suited in satellite radio applications.

In one or more embodiments as exemplified in FIG. 5, the comb of delay elements may comprise a number $N_d=3$ of delay elements, whereas the distance d may have a configurable, controllable or variable (tap-delay) value.

In one or more embodiments as exemplified in FIG. 5, the FIR filter 362" may compute a weighted input signal value $\widehat{x_2^*}(k)$, indicative of an estimation of the interference term defined as $x^*_2(k)=[k_2(t)*x^*(t)]_{t=kT}$, estimation which may be expressed as:

$$\widehat{x_2^*}(k) = \sum_{n=0}^{N_d-1} w_n(k) \, x_{in}^*(k - d\,n).$$

In one or more embodiments as exemplified in FIG. 5, such a weighted signal value F, for instance $F(k)=\widehat{x_2^*}(k)$, may be provided to the adder stage 364, wherein it may be subtracted to the input signal $x_{in}$, providing the output signal $x_{out}$ as difference between such quantities $x_{in}$, F, for instance as $x_{out}(k)=x_{in}(k)-\widehat{x_2^*}(k)$.

In one or more embodiments, the single-branch IRC structure 36', 36" may comprise a detector/correlator stage 368', 368", which may perform an estimation of a residual correlation between an output signal $x_{out}(k)$ and its complex conjugate version $x_{out}(k)$.

In one or more embodiments, the double-branch IRC structure 36 may comprise a detector/correlator stage 368 which may perform an estimation of a residual correlation between a first output signal $s_{out}(k)$ and a conjugated version of a second output signal $i^*_{out}(k)$, or between a second output signal $i_{out}(k)$ and a conjugated version of a first output signal $s^*_{out}(k)$.

In one or more embodiments, such correlation estimations can be performed, for instance:
- using a first approach based on the "last available data", for instance computing and evaluating sample by sample the value of the estimate of residual correlation $R_n(k)$, which may be expressed as $R_n(k) = x_{out}(k) \, x_{out}(k-d\,n)$, $0 \leq n < N_d$, or,
- alternatively, using a second approach based on collecting a set of (sampled) data (points) and applying a "block-based" computation approach.

For instance, in such a second "block-based" computational approach, a second form $R'_n(k)$ for the estimate of residual correlation may be computed as:

$$R'_n(k) = \frac{1}{L}\sum_{l=0}^{L-1} x_{out}(k\,L+l)\, x_{out}(k\,L+l-d\,n) \quad 0 \leq n < N_d$$

wherein:
k is a block index, and
L is a (possibly configurable) block-length.

In one or more embodiments using this second approach, an update function for the coefficients may also comprise a "block-wise" implementation in the computation of the values of the coefficients in the set of coefficients W.

For instance, in one or more embodiments employing a block-based approach, an output signal $x_{out}$ may be expressed as:

$$x_{out}(k\,L+l) = x_{in}(k\,L+l) - \sum_{n=0}^{N_d-1} w_n(k)\, x_{in}^*(k\,L+l-d\,n) \quad 0 \leq l < L$$

while an update function for the coefficients in the set of coefficients W may be expressed as:

$$w_n(k+1) = w_n(k) + \frac{\mu}{L}\sum_{l=0}^{L-1} x_{out}(k\,L+l)\, x_{out}(k\,L+l-d\,n) \quad 0 \leq n < N_d.$$

It is noted that the first "last available data" approach may be a special case of the second "block-based" approach in the case wherein block-length L is configured to be unitary, for instance L=1.

In one or more embodiments, the inventors have observed that in a frequency spectrum of a signal output by the IRC control loop 36', 36", the residual correlation between the positive spectrum and a mirrored version of the negative spectrum, both containing contributions placed around $\omega_{IF}$ and derived from S and I*, may be intrinsically combined with the residual correlation between the negative spectrum and a mirrored version of the positive spectrum, both containing contributions placed around $-\omega_{IF}$ and derived from I and S*, taking advantage from the fact that both the correlation terms facilitate to converge to the same values of the coefficients.

As mentioned, in one or more embodiments as exemplified in FIG. 5, the result of the computed correlation R, R' may be integrated via a loop filter 369", extending from the detector/correlator 368" to the adaptive filter 362".

As mentioned, in one or more embodiments, residual image crosstalk may be estimated and rejected, for instance with DSP techniques operating in the digital domain, by using a correlator stage 368" and an adaptive filter stage 362", respectively.

Specifically, in one or more embodiments the FIR filter 362" may output a filtered signal $\widehat{x_2^*}(k)$ which may be subtracted to the IRC input signal $x_{in}(k)$, in order to reduce (and virtually remove), on the resulting IRC output signal $x_{out}(k)$, the crosstalk effect due to I/Q imbalance in the RFFE 10.

In one or more embodiments, the IRC control loop 36" may converge to an improved set of filter coefficients W, e.g., optimal in the sense of Least Mean Squares (LMS).

Specifically, the set of coefficients W of the FIR filter 362" may be updated using the information coming from the loop filter 369", as a function of signals received from the correlator 368".

One or more embodiments may comprise an automatic gain controller (AGC) stage 366, which may facilitate maintaining a fixed signal level at the input of the detector/correlator 368", in order to have convergence with an almost stable time constant, independently from the input signal power condition.

As mentioned, performances of known techniques may be limited by the decorrelation time of each of the "clean" source signals s(t), i(t) (indicative of desired and image signals, respectively, without crosstalk), in particular when the loop operates at high sampling rate, either due to intentional oversampling or to particular spectral conditions. Specifically, such a limitation may be present when the decorrelation time is much higher than the sampling period.

As mentioned, wideband receivers may be affected more critically by such a problem and its related effects due to the presence of a strongly frequency-dependent I/Q imbalance.

Figure 6:
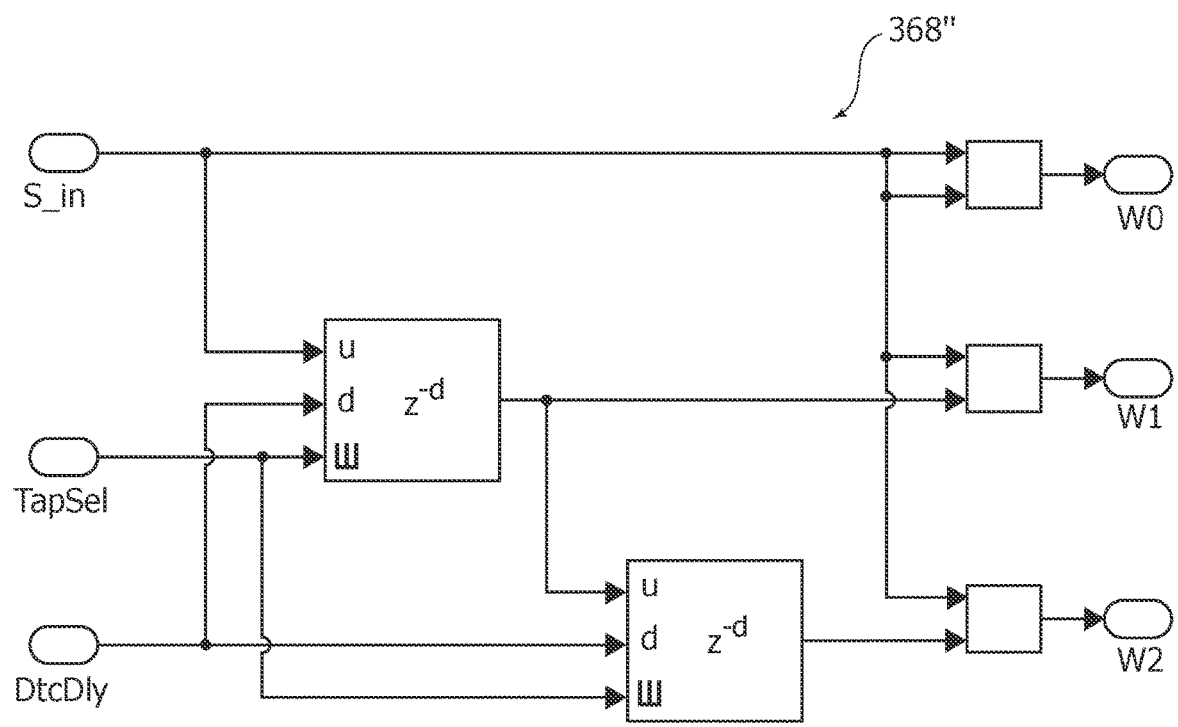
FIGS. 6 and 7 are exemplary of portions of the control loop arrangement of FIG. 5.
Figure 7:
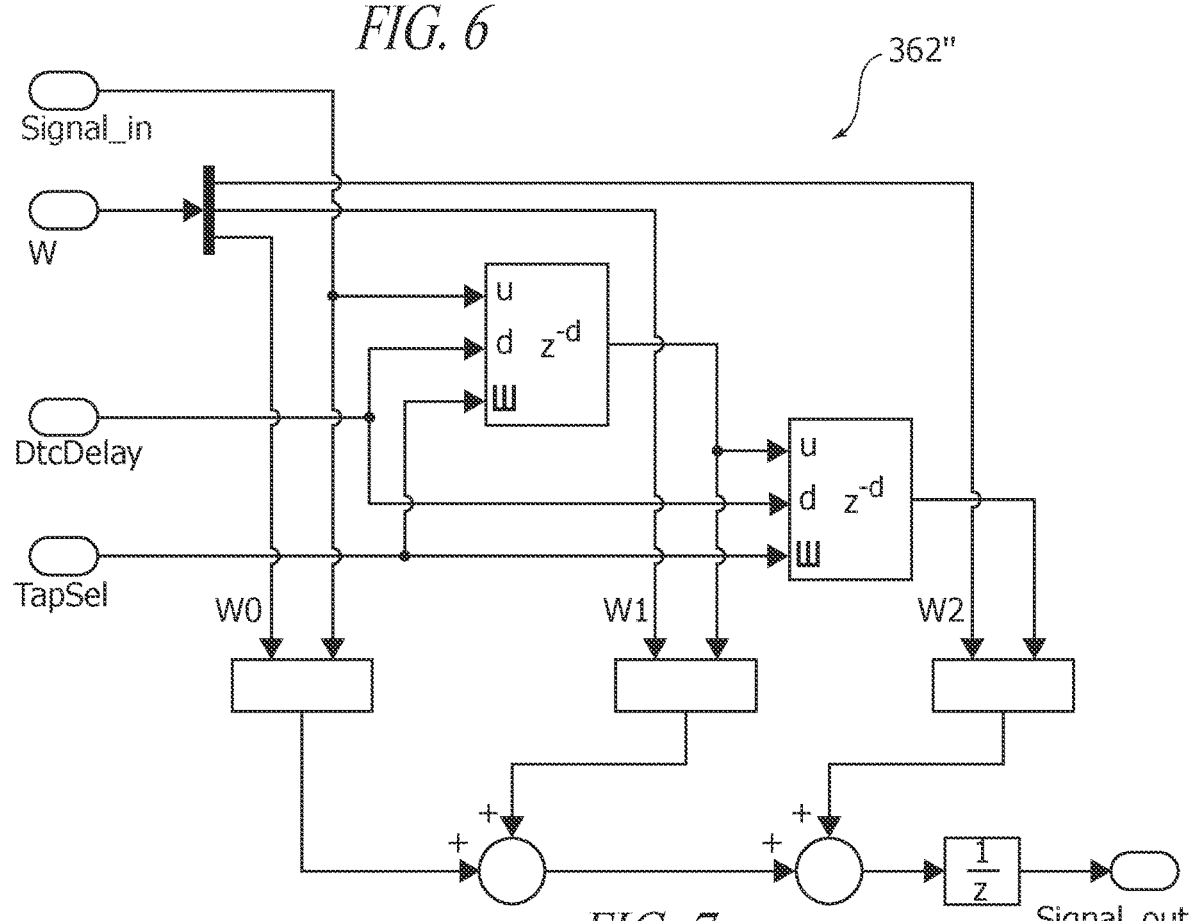

In one or more embodiments as exemplified in FIGS. 5, 6 and 7, it may be possible to configure the IRC control loop 36" to compute coefficients W in different way depending on the application, advantageously increasing flexibility.

For instance, the detector/correlator stage 368" in the IRC control loop 36" may comprise:
- a first input TapSel configured to be coupled to a first tap-selection configuration register 3680, wherein the detector/correlator stage 368" may be operated with a single-tap or multi-tap IRC implementation as a function of a first value stored in the first tap-selection configuration register 3680,
- a second input DtcDly configured to be coupled to a second tap-delay configuration register 3682, wherein the detector/correlator stage 368" may be operated with a tap-delay value d (in number of samples) as a function of a second value stored in the second tap-delay configuration register 3682, and
- optionally, a third input BlkLen configured to be coupled to a third configuration register 3684, wherein the detector/correlator stage 368" may be operated with a block-length L value selected as a function of a third value stored in the third block-length configuration register 3684.

In one or more embodiments, the possibility to use the second tap-delay configuration register 3682 to select a convenient tap-delay distance d value may facilitate performing correlation processing solely for a subset of delay elements, which may be selected accordingly.

In one or more embodiments as exemplified in FIG. 5, the FIR filter stage 362" in the IRC control loop 36" may comprise, for instance:

a first input TapSel configured to be coupled to the first tap-selection configuration register 3680, wherein the FIR filter stage 362" may be operated with a single-tap or multi-tap implementation as a function of the first value stored in the first tap-selection configuration register 3680, a second input DtcDly configured to be coupled to the second tap-delay configuration register 3682, wherein the FIR filter stage 362" may be operated with a tap-delay value d (in number of samples) as a function of the second value stored in the second tap-delay configuration register 3682.

In one or more embodiments, for instance, the adaptive filter stage 362" in the IRC loop 36" may comprise a 3-tap type FIR filter having a "comb" implementation with tap-delay d selected as a function of the value in the second tap-delay configuration register 3682, after activating the FIR implementation of the filter stage 362" as a function of the value in the first tap-selection configuration register 3680.

In one or more embodiments as exemplified in FIG. 5, the optional block-length configuration register 3684 can be used to configure block-wise calculation of correlation and update of coefficients W, facilitating to increase flexibility of the processing system 36, 36', 36".

In one or more embodiments, the loop filter 369" may comprise a set of registers 3690, 3692, 3694 storing respective loop filter parameters μ, PS, Winit.

In one or more embodiments, for instance:

a first configuration register 3690 may comprise, e.g., an adequate integration coefficient μ, and/or a second configuration register 3692 may be used to select a "pre-set values" functionality PS, and/or a third configuration register (or set of registers) 3694 may comprise optional pre-set coefficient values Winit, which may be pre-stored in the dedicated register memory locations 3694 and may be used to initialize coefficients W for the FIR filter 362' when the pre-set values option PS is selected from 3692.

In one or more embodiments, the loop filter 369" in the IRC control loop 36" may comprise, for instance:

a first input mu configured to be coupled to such a first configuration register 3690 which may comprise, e.g., an adequate integration coefficient and/or a second input Preset configured to be coupled to such a second configuration register 3692 which may be used to select a "pre-set values" functionality PS, and/or a third (set of) input(s) Winit configured to be coupled to such a third (set of) configuration register(s) 3694, comprising optional pre-set coefficient values Winit, which may be pre-stored in the dedicated register memory locations 3694 and may be used to initialize coefficients W for the FIR filter 362' when the pre-set values option PS is selected from 3692, an additional input TapSel configured to be coupled to the tap-selection configuration register 3680, wherein the loop filter 369" may be operated with a single-tap or multi-tap IRC implementation as a function of the value stored in tap-selection configuration register 3680.

In one or more embodiments, such a solution 36" may facilitate avoiding to select a subset of elements which are separated by a short delay, advantageously, mitigating side effects due to the decorrelation time of (clean) source signals s(t), i(t).

Figure 8A:
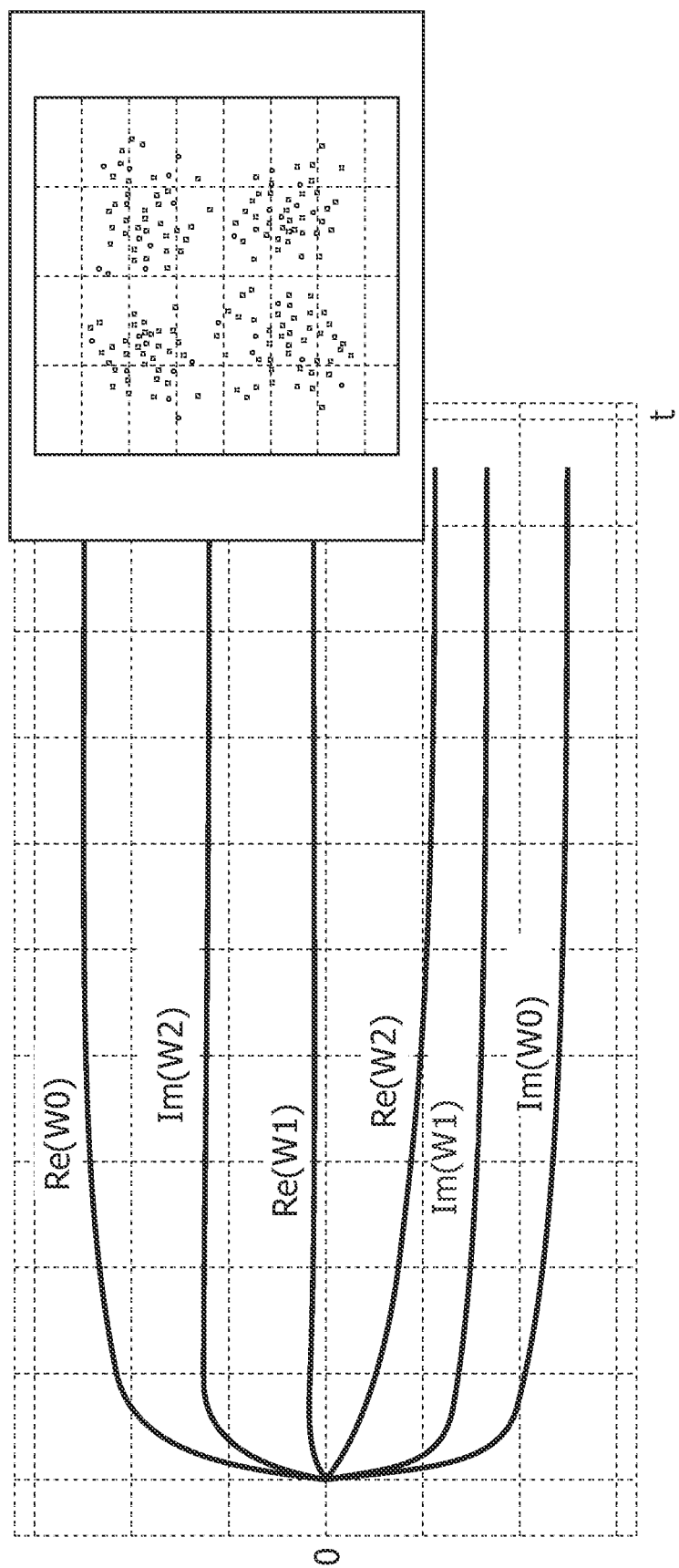
FIGS. 8A and 8B are exemplary of possible behaviors of signals in one or more embodiments.
Figure 8B:
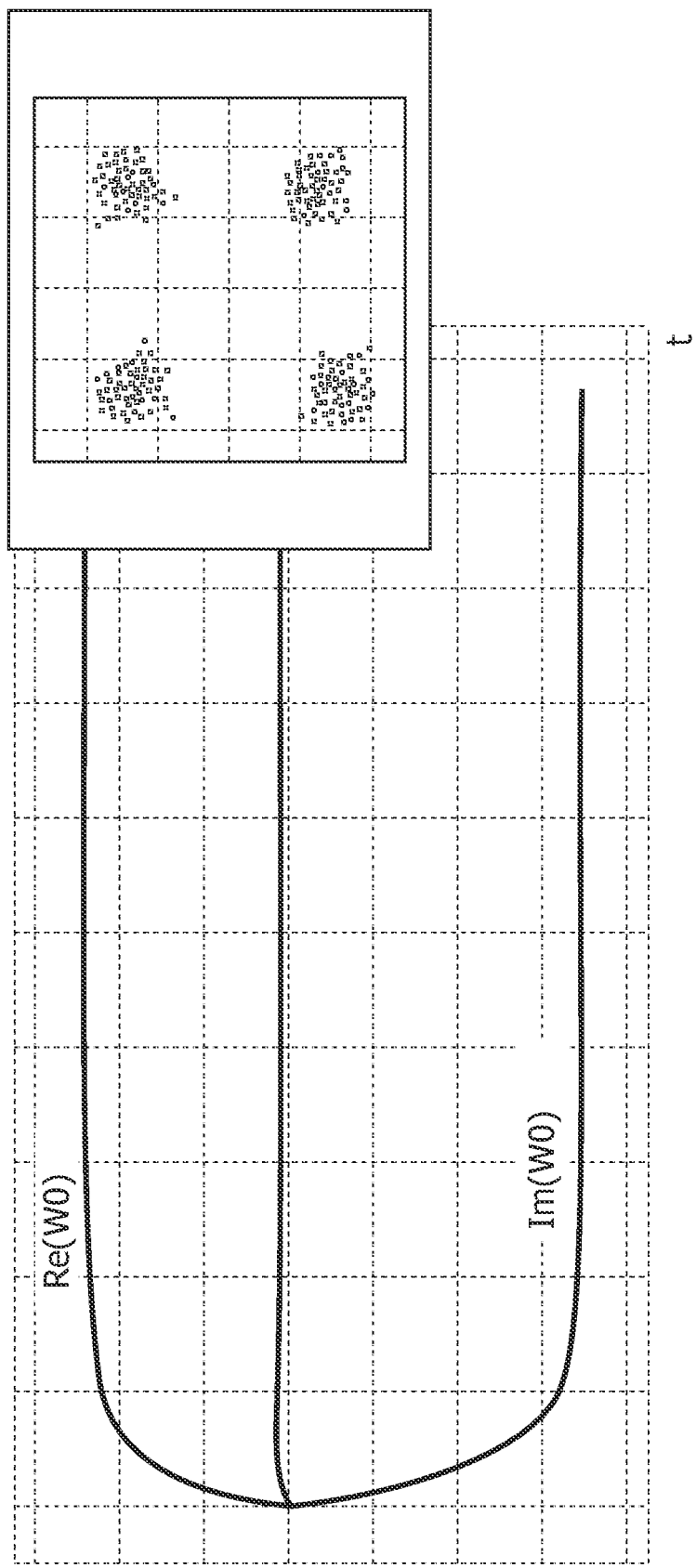

One or more embodiments as exemplified in FIGS. 8A and 8B, may be related to a QPSK application adopting the IRC control loop 36, 36', 36", wherein the expected (optimum) value for a first FIR coefficient $w_1$ and a second FIR coefficient $w_2$ in the set of coefficients W may be zero.

In one or more embodiments as exemplified in FIG. 8A, when a short tap-delay is used (e.g., d=1), the loop 36 may converge to sub-optimal values, e.g., due to the side effects related to the decorrelation time of the clean sources, in the detector/correlator 368. As a result, a first QPSK constellation as exemplified in FIG. 8A may have a "slightly confused" distribution, due to the poor signal-to-interferer ratio, generating a high bit error rate.

In one or more embodiments as exemplified in FIG. 8B, when a long tap-delay is used (e.g., d=12), side effects due to the decorrelation time of the clean sources are mitigated and the loop 36 may converge to the satisfactory value, improving the quality of the QPSK constellation, due to a higher signal-to-interferer ratio and, consequently, resulting in a negligible bit error rate.

As exemplified in FIG. 8B, the IRC loop 36 may facilitate recovering full system functionality by attenuating the crosstalk effects and providing output signal $x_{out}(k)$ having values close to those that may be obtained in the ideal case (see, for instance, the discussion in the foregoing with respect to ideal case).

Figure 9:
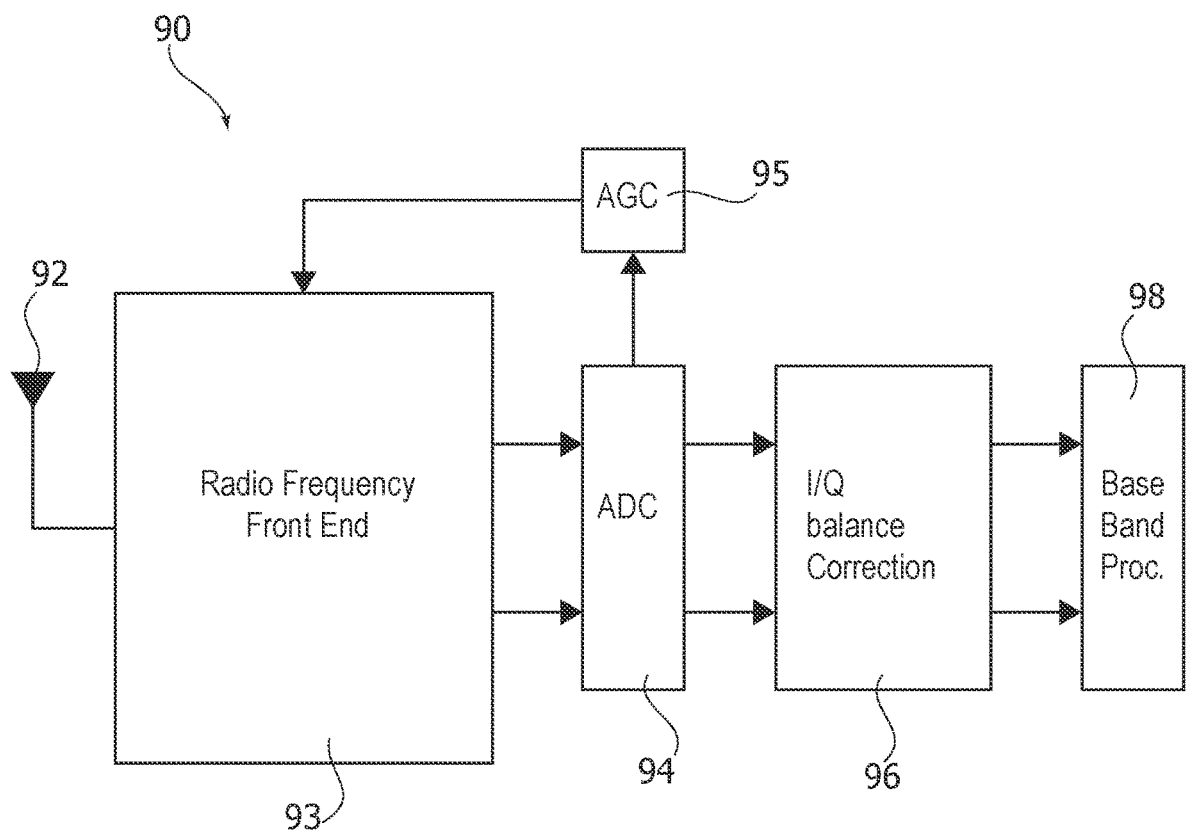
FIG. 9 is exemplary of a receiver arrangement as per the present disclosure.

One or more embodiments as exemplified in FIG. 9, may comprise a communication device 90, equipped with circuitry configured to perform an image rejection correction method as discussed herein.

As exemplified in FIG. 9, in one or more embodiments such a communication device 90, e.g., an RF receiver, may comprise:

an antenna 92, configured to sense electromagnetic signals, a radio frequency front-end (RFFE) module 93, coupled to the antenna 92 and configured to receive the RF signal therefrom and to process it, an analog-to-digital converter (ADC) 94, configured to receive the processed signal from the RFFE module 93;

an automatic gain controller (AGC) stage 95, which may couple the ADC module 94 with the RFFE module 93, processing circuitry 96, configured to correct I/Q imbalance problem, according to one or more embodiments, and a baseband processor 98, configured to further process the imbalance-corrected signal, received from the processing circuitry 96.

In one or more embodiments, the communication device 90 may be in a transceiver, for example, and may be utilized for receiving satellite, terrestrial or cable television or radio signals, or any RF signal requiring a frequency down-conversion through analog I/Q mixer.

In one or more embodiments, the receiver 90 may be operable to receive satellite, terrestrial or cable television or radio signals, down-convert and process the signals for communication to a display device and/or a set of loudspeakers.

For instance, the RFFE 93 may comprise one or more RF receive (Rx) and transmit (Tx) paths for receiving signals from a satellite system, cable TV head-end, and/or terrestrial TV antennas, for example.

In one or more embodiments, the RFFE may further comprise impedance matching elements, low-noise amplifiers (LNAs), power amplifiers, variable gain amplifiers, and filters, for example. In one or more embodiments the RFFE stage 93 may thus be operable to receive, amplify, and filter RF signals before communicating them to, e.g., the baseband processor 98.

In one or more embodiments, the ADC 94 may comprise a wideband ADC and may be operable to convert received analog signals to digital signals.

The processing circuitry 96 may comprise a compensation circuit 30, 30' comprising an IRC loop circuit 36, 36', 36" as discussed in the foregoing, for instance with respect to FIG. 5, or it may comprise general processing means and a memory configured to perform the method of imbalance correction 36, 36', 36" according to one or more embodiments, e.g., via software.

In one or more embodiments, the process may be performed entirely in the digital circuitry without using complex analog circuitry.

In one or more embodiments, the communication device processing circuitry 96 may comprise a memory, e.g., a programmable memory module that may be operable to store software and data, for example, for the operation of the receiver device 90.

For instance, the memory may store the adaptive filter coefficients computed in the IRC control loop in the compensation circuit.

One or more embodiments may be employed in any communication receiver 90 in which signal processing employs a frequency down-conversion stage based on an analog I/Q mixer, regardless of the information content of the received signal (broadcasting services, networks, astronomy, etc.), the modulation technique that is adopted (AM, FM, OFDM, QPSK, etc.) and the physical nature of the transmission channel, which can be based on a radio link (terrestrial or via satellite) or on a medium-guided approach (metal cable, waveguide, optical fiber, etc.).

As mentioned, some examples of such communication receivers may be used for broadcasting services (television, radio, positioning systems: GNSS and others, etc.) or for network services (point-to-point, point-to-multipoint, switched networks for telephonic signals, digital data, etc.).

One or more embodiments may improve performances of, among others, communication receivers for terrestrial radio wideband receivers, satellite radio wideband receivers, satellite GNSS receivers.

As exemplified herein, a method (for instance, 30, 30') may comprise:
receiving an input signal (for instance, $x_{in}$, $X_{in}$) comprising at least one sequence of input data samples separated by a sampling period (for instance, T) therebetween, the input signal comprising a desired signal component and an interfering signal component superimposed thereon,
applying interfering component estimation processing (for instance, 36, 36', 36") to said input signal obtaining as a result a filtered signal (for instance, F) comprising a sequence of filtered data samples,
subtracting (for instance, 364A, 364B, 364', 364") said filtered signal from said input signal and obtaining as a result an output signal (for instance, $x_{out}$, $X_{out}$) comprising a sequence of output data samples,
wherein said interfering component estimation processing comprises:
a) applying conjugating processing (for instance, 360A, 360B, 360', 360") to said input signal, providing a conjugated version of said input signal,
b) computing of at least one adaptive signal processing coefficient (for instance, w; $w_0$, $w_1$, $w_2$) value,
c) applying adaptive signal processing (for instance, 362A, 362B, 362', 362") to said conjugated version of said input signal using said at least one adaptive processing coefficient, wherein said computing at least one adaptive signal processing coefficient (w; $w_0$, $w_1$, $w_2$) value comprises:
i) performing correlation processing (for instance, 368, 368', 368") between said sequence of output data samples of the output signal ($x_{out}$, $X_{out}$) and a conjugated version of said sequence of output data samples of the output signal ($x_{out}$, $X_{out}$) and obtaining as a result a sequence of estimates of residual correlation,
ii) applying integration processing (for instance, 369, 369', 369") to said sequence of estimates of residual correlation provided (368, 368', 368"), said integration processing comprising an integration step parameter ($\mu$) and at least one starting point parameter (Winit),
iii) obtaining at least one computed adaptive signal processing coefficient (w; $w_0$, $w_1$, $w_2$) as a result of applying said integration processing (369, 369', 369").

As exemplified herein, said applying adaptive signal processing may comprise applying processing selected (for instance, 3680, 3682, 3684) out of:
adaptive multiplication processing (for instance, 362A, 362B, 362') having at least one multiplication factor equal to said at least one computed adaptive signal processing coefficient (for instance, w),
adaptive finite impulse response, FIR, filtering processing (for instance, 362"), such as second order or 3-tap adaptive FIR filtering processing, said adaptive FIR filtering processing (for instance, 362") comprising computing a weighted sum of a conjugated version of data samples in said sequence of input data samples comprised in said input signal using said at least one adaptive processing coefficient as weights of said weighted sum.

As exemplified herein:
adaptive FIR filtering processing may comprise applying said at least one adaptive processing coefficient to a subset of elements belonging to an input delay line of the FIR at a related subset of delay values, and
performing correlation processing and applying integration processing respectively may comprise calculating and integrating estimates of residual correlation at delay values of said related subset of delay values.

As exemplified herein, adaptive FIR filtering coefficients may be applied to a comb of elements belonging to said input delay line of the FIR, the comb comprising a number $N_d$ of delay elements having a distance value multiple of said sampling period by a factor d.

As exemplified herein, said distance value may be in excess ten times with respect to said sampling period.

As exemplified herein, selecting between said adaptive multiplication processing and said adaptive FIR filtering processing in applying said adaptive signal processing may comprise:
providing a first adaptive signal processing configuration register (for instance, 3680) configured to store a first value or a second value,
selecting between applying one of said adaptive multiplication processing or said adaptive FIR filtering processing as a function of said first value or said second value stored in said first adaptive signal processing configuration register, respectively.

As exemplified herein, the method may comprise:
providing at least one second configuration register (for instance, 3682) configured for storing indexes of delay elements in the set of delay elements of the delay line, and selecting a subset of delay elements in the set of delay elements of the delay line as a function of said indexes stored in the at least one second configuration register.

As exemplified herein, applying integration processing may comprise applying loop filter processing (369) to said sequence of estimates of residual correlation provided.

As exemplified herein, applying integration processing may comprise at least one of:

providing a first integration parameter register (for instance, 3690) configured to store a value of said integration step parameter (for instance, µ), providing at least one second integration parameter register (for instance, 3694) configured to store a value of said at least one starting point parameter (for instance, Winit) and a third integration parameter register (for instance, 3692) configured to activate (for instance, PS, 3692) said integration processing to use said value of said at least one starting point parameter (for instance, Winit).

As exemplified herein, computing at least one value of said at least one adaptive processing coefficient (for instance, w; $w_0$, $w_1$, $w_2$) may comprise applying automatic gain control, AGC, processing (for instance, 366) to said output signal.

As exemplified herein, performing correlation processing between said sequence of output data samples of the output signal and a conjugated version of said sequence of output data samples of the output signal may comprise performing block-like correlation of a number of adjacent data samples forming a block having block-length L of data samples, for example, said block-length L is selected as a function of a length value stored in a configuration register (for instance, 3684).

As exemplified herein, a circuit may comprise:

an input node (for instance, $x_{in}$, $X_{in}$) configured to receive at least one input signal (for instance, $x_{in}$, $X_{in}$) comprising at least one sequence of input data samples, the input signal comprising a desired signal component and an interfering signal component superimposed thereon, wherein input data samples in the sequence of input data samples are separated by a sampling period (for instance, T) therebetween, signal processing circuitry (for instance, 30, 30', 96) configured to apply interfering component removal processing (for instance, 36, 36', 36") to the received at least one input signal (for instance, $x_{in}$, $X_{in}$) with the method as exemplified herein.

As exemplified herein, said signal processing circuitry may further comprise a complex down-converter circuit (for instance, 22) comprising:

a first mixer branch (for instance, 22A), comprising a common input node (for instance, $x_{in}$, $X_{in}$) configured to receive at least one signal (for instance, $x_{in}$, $X_{in}$), a first digital mixer (for instance, 24A), a first digital low pass filter (for instance, 26A), a first baseband decimator (for instance, 28A) with decimation factor M and a first interfacing node (for instance, $s_{in}$), the first interfacing node configured to provide a first signal component (for instance, $s_{in}$, and a second mixer branch (for instance, 22B), comprising a common input node (for instance, $x_{in}$, $X_{in}$) configured to receive at least one signal a second digital mixer (for instance, 24B), a second digital low pass filter (for instance, 26B), a second baseband decimator (for instance, 28B) with decimation factor M and a second interfacing node (for instance, $i_{in}$), the second interfacing node configured to provide a second signal component (for instance, $i_{in}$).

As exemplified herein, a radio frequency receiver device (for instance, 90) may comprise:

an antenna (for instance, 92) configured to receive an RF signal, a radio frequency front-end (for instance, 93) coupled to said antenna, the radio frequency front-end configured to receive said RF signal at an input node (for instance, $x_{RF}$) and to apply down-conversion processing to said radio frequency signal, the radio frequency front-end having a first output node (for instance, $x_{IF}$) and configured for providing an intermediate frequency, IF, signal as a result of said down-conversion processing at said first output node (for instance, $x_{IF}$), an analog-to-digital converter, ADC, stage (for instance, 94) having an input node coupled to said first output node ($x_{IF}$) and a second output node, the ADC stage configured to receive said IF signal from the first output node, to apply signal sampling thereto and to provide a sampled sequence of data samples of said IF signal at said second output node, a circuit (for instance, 96) as exemplified herein, having said input node coupled to said second output node of said ADC stage, the circuit configured to receive said IF signal as an input signal.

As exemplified herein, a computer program product loadable into the memory of at least one processing circuit (for instance, 96) may comprise software code portions for executing the steps of the method as exemplified herein when the product is run on at least one processing circuit.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

The invention claimed is:

1. A method, comprising:
   receiving an input signal comprising at least one sequence of input data samples separated by a sampling period therebetween, the input signal comprising a desired signal component and an interfering signal component superimposed thereon;
   applying interfering component estimation processing to said input signal obtaining as a result a filtered signal comprising a sequence of filtered data samples; and
   subtracting said filtered signal from said input signal and obtaining as a result an output signal comprising a sequence of output data samples,
   wherein said interfering component estimation processing comprises:
      a) applying conjugating processing to said input signal, providing a conjugated version of said input signal;
      b) computing of at least one adaptive signal processing coefficient value; and
      c) applying adaptive signal processing to said conjugated version of said input signal using at least one adaptive signal processing coefficient,
      wherein said computing at least one adaptive signal processing coefficient value comprises:
         i) performing correlation processing between said sequence of output data samples of the output signal and a conjugated version of said sequence of output data samples of the output signal and obtaining as a result a sequence of estimates of residual correlation; and
         ii) applying integration processing to said sequence of estimates of residual correlation provided, said integration processing using an integration step parameter and at least one starting point parameter, obtaining at least one computed adaptive signal processing coefficient as a result of applying said integration processing.

2. The method of claim 1, wherein said applying adaptive signal processing comprises applying processing selected out of:
   adaptive multiplication processing having at least one multiplication factor equal to said at least one computed adaptive signal processing coefficient; and
   adaptive finite impulse response, FIR, filtering processing, said adaptive FIR filtering processing comprising computing a weighted sum of a conjugated version of data samples in said sequence of input data samples comprised in said input signal, using said at least one adaptive signal processing coefficient as weights of said weighted sum.

3. The method of claim 2, wherein:
   the adaptive FIR filtering processing comprises applying said at least one adaptive signal processing coefficient to a subset of elements belonging to an input delay line of the FIR at a related subset of delay values; and
   performing correlation processing and applying integration processing respectively comprise calculating and integrating estimates of residual correlation at delay values of said related subset of delay values.

4. The method of claim 3, wherein said adaptive FIR filtering coefficients are applied to a comb of elements belonging to said input delay line of the FIR, the comb comprising a number $N_d$ of delay elements, the delay elements having a distance value multiple of said sampling period by a factor d.

5. The method of claim 4, wherein said distance value is in excess ten times with respect to said sampling period.

6. The method of claim 2, wherein selecting between said adaptive multiplication processing and said adaptive FIR filtering processing in applying said adaptive signal processing comprises:
   providing a first adaptive signal processing configuration register configured to store a first value or a second value; and
   selecting between applying one of said adaptive multiplication processing or said adaptive FIR filtering processing as a function of said first value or said second value stored in said first adaptive signal processing configuration register, respectively.

7. The method of claim 4, comprising:
   providing at least one configuration register configured for storing indexes of
   delay elements in a set of delay elements of the delay line; and
   selecting a subset of delay elements in the set of delay elements of the delay line as a function of said indexes stored in the at least one configuration register.

8. The method of claim 1, wherein said applying integration processing comprises applying loop filter processing to said sequence of estimates of residual correlation provided.

9. The method of claim 1, wherein applying integration processing comprises at least one of:
   providing a first integration parameter register configured to store a value of said integration step parameter;
   providing a second integration parameter register configured to store a value of said at least one starting point parameter and a third integration parameter register configured to store a value indicating whether to activate said integration processing to use said value of said at least one starting point parameter; or
   combinations thereof.

10. The method of claim 1, wherein said computing at least one value of said at least one adaptive signal processing coefficient comprises applying automatic gain control, AGC, processing to said output signal.

11. The method of claim 1, wherein said performing correlation processing between said sequence of output data samples of the output signal and a conjugated version of said sequence of output data samples of the output signal comprises performing block-like correlation of a number of adjacent data samples forming a block having block-length L of data samples, wherein said block-length L is selected as a function of a length value stored in a configuration register.

12. The method of claim 2, wherein the adaptive FIR filtering processing comprises second order adaptive FIR filtering processing.

13. A circuit, comprising:
   an input node configured to receive an input signal comprising at least one sequence of input data samples, the input signal comprising a desired signal component and an interfering signal component superimposed thereon, wherein input data samples in the sequence of input data samples are separated by a sampling period therebetween; and
   signal processing circuitry coupled to the input node, wherein the signal processing circuitry, in operation:

applies interfering component estimation processing to said input signal obtaining as a result a filtered signal comprising a sequence of filtered data samples; and subtracts said filtered signal from said input signal, obtaining an output signal comprising a sequence of output data samples, wherein said interfering component estimation processing comprises:

applying conjugating processing to said input signal, providing a conjugated version of said input signal;

computing one or more adaptive signal processing coefficients; and applying adaptive signal processing to said conjugated version of said input signal using the one or more adaptive signal processing coefficients, wherein said computing the one or more adaptive signal processing coefficients comprises:

performing correlation processing between said sequence of output data samples of the output signal and a conjugated version of said sequence of output data samples of the output signal, obtaining a sequence of estimates of residual correlation; and applying integration processing to said sequence of estimates of residual correlation, said integration processing using an integration step parameter and at least one starting point parameter, obtaining the one or more adaptive signal processing coefficients.

14. The circuit of claim 13, wherein the signal processing circuitry, in operation, selectively applies one of:

adaptive multiplication processing having a multiplication factor equal to said computed adaptive signal processing coefficient; and adaptive finite impulse response, FIR, filtering processing, said adaptive FIR filtering processing comprising computing a weighted sum of a conjugated version of data samples in said sequence of input data samples comprised in said input signal, using said adaptive signal processing coefficient as a weight of said weighted sum.

15. The circuit of claim 14, wherein:

the adaptive FIR filtering processing comprises applying the adaptive signal processing coefficient to a subset of elements belonging to an input delay line of the FIR at a related subset of delay values; and performing the correlation processing and applying the integration processing respectively comprise calculating and integrating estimates of residual correlation at delay values of said related subset of delay values.

16. The circuit of claim 15, wherein adaptive FIR filtering coefficients are applied to a comb of elements belonging to said input delay line of the FIR, the comb comprising a number $N_d$ of delay elements, the delay elements having a distance value multiple of said sampling period by a factor d.

17. The circuit of claim 15, wherein said distance value is in excess of ten times the sampling period.

18. The circuit of claim 14, wherein the signal processing circuitry, in operation, selects between said adaptive multiplication processing and said adaptive FIR filtering processing by:

storing a first value or a second value in a first adaptive signal processing configuration register; and applying one of said adaptive multiplication processing or said adaptive FIR filtering processing as a function of said first value or said second value stored in said first adaptive signal processing configuration register.

19. The circuit of claim 16, wherein the signal processing circuitry, in operation, stores indexes of delay elements in a set of delay elements of the delay line in a configuration register; and selects a subset of delay elements in the set of delay elements of the delay line as a function of said indexes.

20. The circuit of claim 13, wherein the integration processing comprises applying loop filter processing to said sequence of estimates of residual correlation.

21. The circuit of claim 13, wherein the integration processing comprises:

storing a value of said integration step parameter;

storing a value of said at least one starting point parameter and a control parameter to activate said integration processing to use said value of said at least one starting point parameter; or both.

22. The circuit of claim 13, wherein the signal processing circuitry, in operation, applies automatic gain control, AGC, processing to the output signal.

23. The circuit of claim 13, wherein said performing correlation processing between said sequence of output data samples of the output signal and the conjugated version of said sequence of output data samples of the output signal comprises performing block-like correlation of a number of adjacent data samples forming a block having block-length L of data samples, wherein said block-length L is selected as a function of a length value stored in a configuration register.

24. The circuit of claim 14, wherein the adaptive FIR filtering processing comprises second order adaptive FIR filtering processing.

25. The circuit of claim 13, wherein said signal processing circuitry comprises a complex down-converter circuit including:

a first mixer branch, having a common input node configured to receive at least one signal, a first digital mixer, a first digital low pass filter, a first baseband decimator with decimation factor M and a first interfacing node, the first interfacing node configured to provide a first signal component;

a second mixer branch, having a common input node configured to receive at least one signal, a second digital mixer, a second digital low pass filter, a second baseband decimator with decimation factor M and a second interfacing node, the second interfacing node configured to provide a second signal component; and an image rejection correction (IRC) control loop configured to apply interfering component removal processing to said first signal component, and to said second signal component.

26. A radio-frequency receiver, comprising:

an antenna configured to receive an RF signal;

a radio frequency front-end coupled to said antenna, the radio frequency front-end configured to receive said RF signal at an input node and to apply down-conversion processing to said radio frequency signal, the radio frequency front-end having a first output node and configured for providing an intermediate frequency, IF, signal as a result of said down-conversion processing at said first output node;

an analog-to-digital converter, ADC, having an input node coupled to said first output node and a second output node, the ADC configured to receive said IF signal from the first output node, to apply signal sampling thereto and to provide a sampled sequence of data samples of said IF signal at said second output node; and signal processing circuitry coupled to the second output node, wherein the signal processing circuitry, in operation:

applies interfering component estimation processing to an input signal, obtaining a filtered signal comprising a sequence of filtered data samples; and subtracts said filtered signal from said input signal, obtaining an output signal comprising a sequence of output data samples, wherein said interfering component estimation processing comprises:

applying conjugating processing to said input signal, generating a conjugated version of said input signal;

computing an adaptive signal processing coefficient; and applying adaptive signal processing to said conjugated version of said input signal using the adaptive signal processing coefficient, wherein computing the adaptive signal processing coefficient comprises:

performing correlation processing between said sequence of output data samples of the output signal and a conjugated version of said sequence of output data samples of the output signal, obtaining a sequence of estimates of residual correlation; and applying integration processing to said sequence of estimates of residual correlation, said integration processing using an integration step parameter and at least one starting point parameter, obtaining the adaptive signal processing coefficient.

27. The receiver of claim 26, wherein said signal processing circuitry comprises a complex down-converter circuit including:

a first mixer branch, having a common input node configured to receive at least one signal, a first digital mixer, a first digital low pass filter, a first baseband decimator with decimation factor M and a first interfacing node, the first interfacing node configured to provide a first signal component;

a second mixer branch, having a common input node configured to receive at least one signal, a second digital mixer, a second digital low pass filter, a second baseband decimator with decimation factor M and a second interfacing node, the second interfacing node configured to provide a second signal component; and an image rejection correction (IRC) control loop configured to apply interfering component removal processing to said first signal component, and to said second signal component.

28. The receiver of claim 26, wherein said interfering component estimation processing comprises:

computing a plurality of adaptive signal processing coefficient values; and applying adaptive signal processing to said conjugated version of said input signal using the plurality of adaptive signal processing coefficient values.

29. A non-transitory computer-readable medium having contents which configure a receiver to perform a method, the method comprising:

applying interfering component estimation processing to an input signal, obtaining a filtered signal comprising a sequence of filtered data samples; and subtracting the filtered signal from the input signal, obtaining an output signal comprising a sequence of output data samples, wherein the interfering component estimation processing comprises:

applying conjugating processing to said input signal, generating a conjugated version of the input signal;

computing one or more adaptive signal processing coefficients; and applying adaptive signal processing to the conjugated version of the input signal using the one or more adaptive signal processing coefficients, wherein the computing the adaptive signal processing coefficients comprises:

performing correlation processing between the sequence of output data samples of the output signal and a conjugated version of the sequence of output data samples of the output signal, obtaining a sequence of estimates of residual correlation; and applying integration processing to the sequence of estimates of residual correlation, said integration processing using an integration step parameter and at least one starting point parameter, obtaining the adaptive signal processing coefficients.

30. The non-transitory computer-readable medium of claim 29 wherein the contents comprise instructions, which, when executed by a processor of the receiver, cause the receiver to perform the method.

* * * * *